United States Patent
Lee et al.

(10) Patent No.: US 11,645,241 B2
(45) Date of Patent: May 9, 2023

(54) PERSISTENT MEMORY FILE STORE FOR DIRECTLY MAPPED PERSISTENT MEMORY DATABASE

(71) Applicant: Oracle International Corporation, Redwood Shores, CA (US)

(72) Inventors: J. William Lee, Saratoga, CA (US); William H. Bridge, Jr., Alameda, CA (US); Ankur Kemkar, San Jose, CA (US); Vipin Gokhale, San Ramon, CA (US); Sivaram Prasad Soma, Cupertino, CA (US); Vishvesh Mohanarangam Selvakumaar, Vancouver (CA); Juan R. Loaiza, Woodside, CA (US); Wei-Ming Hu, Palo Alto, CA (US); Neil J. S. MacNaughton, Los Gatos, CA (US); Adam Y. Lee, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 225 days.

(21) Appl. No.: 16/812,833

(22) Filed: Mar. 9, 2020

(65) Prior Publication Data
US 2021/0081372 A1 Mar. 18, 2021

Related U.S. Application Data

(60) Provisional application No. 62/899,943, filed on Sep. 13, 2019.

(51) Int. Cl.
*G06F 16/182* (2019.01)
*G06F 16/16* (2019.01)
(Continued)

(52) U.S. Cl.
CPC .......... *G06F 16/182* (2019.01); *G06F 9/4411* (2013.01); *G06F 9/5027* (2013.01);
(Continued)

(58) Field of Classification Search
CPC .... G06F 16/182; G06F 9/4411; G06F 9/5027; G06F 9/524; G06F 12/0246;
(Continued)

(56) References Cited

U.S. PATENT DOCUMENTS 7,739,233 B1 * 6/2010 Ghemawat .......... G06F 16/1844
                                                    707/633
8,010,497 B2    8/2011 Verma et al.
(Continued)

OTHER PUBLICATIONS

Zhang et al., "In-Memory Big Data Management and Processing: A Survey", IEEE, vol. 27, No. 7, dated Jul. 1, 2015, pp. 1920-1948.
(Continued)

*Primary Examiner* — Hicham Skhoun
(74) *Attorney, Agent, or Firm* — Hickman Becker Bingham Ledesma LLP; Brian N. Miller

(57) ABSTRACT

Techniques herein store database blocks (DBBs) in byte-addressable persistent memory (PMEM) and prevent tearing without deadlocking or waiting. In an embodiment, a computer hosts a DBMS. A reader process of the DBMS obtains, without locking and from metadata in PMEM, a first memory address for directly accessing a current version, which is a particular version, of a DBB in PMEM. Concurrently and without locking: a) the reader process reads the particular version of the DBB in PMEM, and b) a writer process of the DBMS replaces, in the metadata in PMEM, the first memory address with a second memory address for directly accessing a new version of the DBB in PMEM. In an embodiment, a computer performs without locking: a) storing, in PMEM, a DBB, b) copying into volatile memory,
(Continued)

or reading, an image of the DBB, and c) detecting whether the image of the DBB is torn.

26 Claims, 12 Drawing Sheets

(51) Int. Cl.
*G06F 9/4401* (2018.01)
*G06F 9/50* (2006.01)
*G06F 9/52* (2006.01)
*G06F 12/02* (2006.01)
*G06F 12/123* (2016.01)

(52) U.S. Cl.
CPC .......... *G06F 9/524* (2013.01); *G06F 12/0246* (2013.01); *G06F 12/123* (2013.01); *G06F 16/164* (2019.01); *G06F 2212/163* (2013.01)

(58) Field of Classification Search
CPC ................ G06F 12/123; G06F 16/164; G06F 2212/163; G06F 16/23; G06F 16/25; G06F 16/284

See application file for complete search history.

(56) References Cited

U.S. PATENT DOCUMENTS

| 8,291,269 | B1* | 10/2012 | Ro ...................... G06F 11/1446 |
| | | | 707/823 |
| 10,162,716 | B2* | 12/2018 | Booss .................... G06F 16/21 |
| 10,198,352 | B2 | 2/2019 | Subrahmanyam et al. |
| 10,268,610 | B1 | 4/2019 | McKenney |
| 10,599,630 | B2 | 3/2020 | Li |
| 11,061,884 | B2 | 7/2021 | Li |
| 2002/0103819 | A1* | 8/2002 | Duvillier ................ G06F 16/22 |
| 2008/0071997 | A1* | 3/2008 | Loaiza .................... G06F 9/526 |
| | | | 710/200 |
| 2009/0300419 | A1* | 12/2009 | Silverman ........... G06F 11/2294 |
| | | | 714/E11.026 |
| 2017/0371889 | A1* | 12/2017 | Golander .............. G06F 16/178 |
| 2018/0011893 | A1 | 1/2018 | Kimura |
| 2018/0137052 | A1* | 5/2018 | Boyle ................... G06F 12/084 |
| 2019/0102087 | A1* | 4/2019 | Shi ...................... G06F 9/45533 |
| 2020/0097367 | A1* | 3/2020 | Kim .................... G06F 12/0246 |
| 2020/0142829 | A1* | 5/2020 | Wang .................. G06F 11/0751 |
| 2021/0019257 | A1* | 1/2021 | Shu ....................... G06F 16/215 |

OTHER PUBLICATIONS

Chatzistergiou et al., "Rewind: Recovery WriteAhead System for InMemory NonVolatile DataStructures", Proceedings of the VLDB Endowment, vol. 8, No. 2, dated Jan. 1, 2015, pp. 497-508.

Kelly, Terence, "Good Old Fashion Persistent Memory", www.usenix.org, Winter 2019, vol. 44, No. 4, 6 pages.

Vinogradov, Sergei, "Currency on Presistent Memory: Designing Concurrent Data Structures for Persistent Memory", SDC dated Sep. 2018, 22 pages.

Oleary, Kevin, "How to Detect Persistent Memory Programming Errors Using Intel® Inspector—Persistence Inspector", dated Feb. 15, 2018, 15 pages.

Marathe et al., "Persistent Memcached: Bringing Legacy Code tobByte—Addressable Persistent Memory", dated 2017, 7 pages.

Liu et al., "PMTest: A Fast and Flexible Testing Framework for Persistent Memory Programs", ASPLOS '19, Apr. 13-17, 2019, Providence, RI, USA, 15 pages.

Haria, Swapnil, "Architecture and Software Support for Persistent and Vast Memory", Date of final oral examination Jun. 10, 2019, 143 pages.

Arulra et al., "How to Build a Non-Volatile Memory Database Management System", SIGMOD'17, May 14-19, 2017, Chicago, IL, USA, 6 pages.

Wang et al., "Quantifying the Performance Overheads of PMDK", Proceedings of the International Symposium on Memory Systems, 2018, 3 pages.

Shu et al., "Luna-TX: An Optimized Transactional Mechanism for Persistent Memory", 2019 IEEE Non-Volatile Memory Systems and Applications Symposium (NVMSA), 2019, 6 pages.

* cited by examiner

PERSISTENT MEMORY FILE STORE FOR DIRECTLY MAPPED PERSISTENT MEMORY DATABASE

BENEFIT CLAIM AND RELATED CASE

This application claims the benefit of Provisional Appln. 62/899,943, filed Sep. 13, 2019, the entire contents of which is hereby incorporated by reference as if fully set forth herein, under 35 U.S.C. § 119(e). Incorporated by reference herein in its entirety is U.S. patent application Ser. No. 15/693,273 "DIRECTLY MAPPED BUFFER CACHE ON NON-VOLATILE MEMORY" filed Aug. 31, 2017 by Juan R. Loaiza et al.

FIELD OF THE INVENTION

The present invention relates to storing database blocks in byte addressable persistent memory (PMEM). Torn blocks are prevented without deadlocking or waiting.

BACKGROUND

Atomic, consistent, isolated, durable (ACID) transactions provide data integrity for mutable data. Durable data mutation presents device integration problems because data is altered in a central processing unit (CPU) but persisted on other devices such as disk and/or nonvolatile memory. Device acceleration techniques include bulk data transfer such as with disk blocks and database blocks. A typical relational database management system (RDBMS) is architected on database blocks being a fundamental unit of durable data. However, database blocks have additional concerns such as follows.

Emerging byte-addressable persistent memory (PMEM) is ready for commercialization, including databases. Latency for this new class of nonvolatile storage is expected to be slightly slower than dynamic random access memory (DRAM) but within the same order of magnitude. The storage capacity of a PMEM chip is typically an order of magnitude more than a DRAM chip.

Byte addressability makes PMEM operationally different from other kinds of nonvolatile storage, which are block addressable. Mature solid state drive (SSD) technologies such as flash memory guarantee bulk data atomicity of a data page containing at least half a kilobyte. Whereas, byte addressable PMEM has no such guarantee. For example, a writer may update, in place in PMEM, a subset of bytes of a data block, which is impossible with a block oriented storage device. Thus, byte addressable PMEM may be exposed to data integrity risks that do not occur with block oriented storage. For example, PMEM may suffer a torn data block as follows.

Parallelism may accelerate the RDBMS, such as with concurrent readers and/or writers, such as on separate CPU cores. However, concurrency may jeopardize atomicity with byte addressable PMEM as follows. A typical CPU core may process less than ten bytes per clock cycle. Whereas, a typical database block contains at least a kilobyte. Thus, RDBMS processing of even a fraction of a database block is likely to take several clock cycles for one reader that may accidentally temporally overlap with activity of a writer. An ongoing reader may read some original data from a database block before a sudden write and, after or during the write, read from the database block more data that is not original data. Thus, what the reader processes is a corrupt fusion of previous and next versions of the database block, which is a torn database block. A torn database block can occur even without a CPU, such as with direct memory access (DMA) when a sudden PMEM write collides while an ongoing reader copies a database block from PMEM to DRAM.

A torn database block may occur unless prevented or compensated for by additional behavior. A typical approach entails an exclusive write, such that a writer waits for exclusive use of a database block. A waiting writer may cause two problems. First, RDBMS throughput is reduced. For example, there might be no upper limit on how long a reader may spend with the database block. Second, deadlock may occur, such as when two ongoing readers decide to simultaneously write each other's database block. A typical approach may avoid these pitfalls by always reading a copy of the database block. However, database block copying reduces RDBMS throughput.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
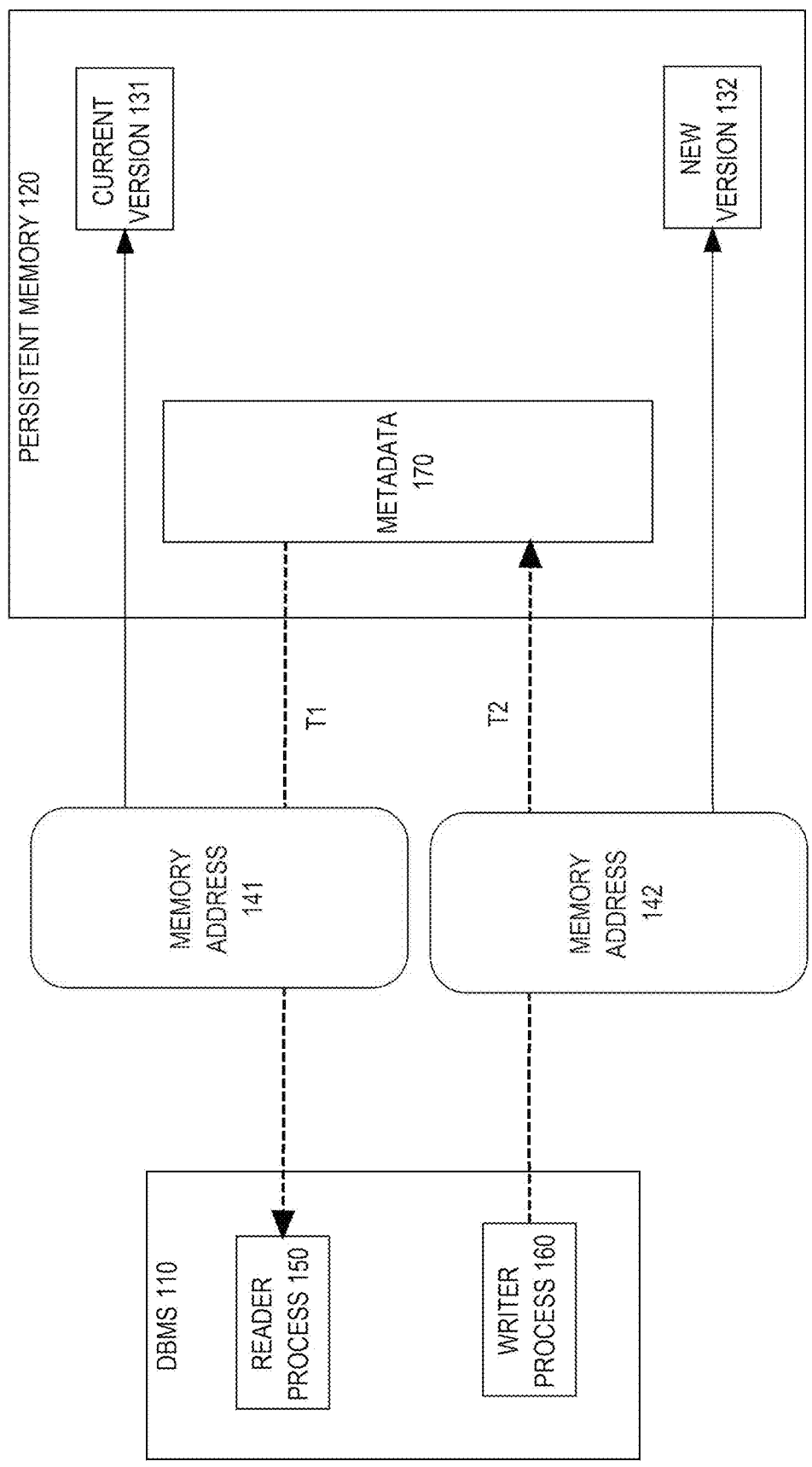
FIG. 1 is a block diagram that depicts an example computer that isolates different versions of a same database block in byte addressable persistent memory (PMEM) to mitigate access conflicts.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein, is a file store, referred to herein as the FsDirect file store, that is designed for use in a database management system (DBMS) on byte addressable persistent memory (PMEM). According to approaches herein, a writer does not wait for an ongoing reader of a same database block, regardless of how long the reader takes with the database block. FsDirect operates by allocation on write of a database block. When writing a block, FsDirect first allocates a new block in the file store and then copies new content into the newly allocated block.

However, the new block does not logically replace an old block until metadata in the PMEM is adjusted. In that metadata, a pointer for a block address is atomically reassigned from addressing a previous version of the block to addressing a new version of the block. Here, atomic reassignment of the pointer persisted in PMEM means that, even though byte addressable PMEM is not block oriented and lacks block atomicity, so long as the pointer itself can be atomically overwritten in PMEM, retrieving the pointer directly from the metadata in PMEM always obtains the PMEM address of the latest version of the block. The atomic switch of a PMEM address stored in the pointer avoids a data block being torn by writes, thereby ensuring data integrity. The previous version of the block is not freed until a reference count of the block reaches zero. Thus, PMEM may store multiple versions of a same block, even though the persisted metadata always only points to the current version of the block. Because an ongoing reader and a sudden writer may simultaneously use separate persistent versions of the data block, the reader of the previous version of the block will not cause the writer of the block to wait. When the previous version is no longer needed, it may eventually be deleted.

FsDirect solves a torn block problem specifically related to directly mapped PMEM databases. Herein, a directly mapped PMEM database is one having data files reside entirely in region(s) of PMEM that are included in the address space of the DBMS. Thus, the DBMS may use the data files in more or less a same way as if the data files were entirely loaded into dynamic random access memory (DRAM), including byte addressing such as to access only a portion of a data block.

To enable multiple versions of data blocks, FsDirect may over-provision PMEM storage slightly to accommodate extra copies of a block for some long duration direct PMEM reads of stale versions.

FsDirect accelerates DBMS operation. When a DBMS runs on top of the FsDirect file store, input/output (I/O) is done via memory copy and/or direct access, not through operating system (OS) calls. OS calls from user space to the operating system kernel are slow. A standardized direct access (DAX) compliant interface is presented herein.

FsDirect provides atomicity of writes to a file in the presence of software faults and power failures. Write atomicity ensures that file read operation will not read a torn (i.e. partially written) block.

Discussed herein are avoidable problems such as emergence of a torn block that may be a consequence of contention of a writer with a reader or another writer of a same block. The state of the art uses block oriented I/O and/or temporally expensive coordination to manage such contention, which may entail lock acquisition, which is pessimistic and blocking (i.e. waiting) when the lock is unavailable, which degrades DBMS throughput. A lock may be a mutual exclusion (mutex) or semaphore, which may be somewhat hidden (although still operative) when wrapped by a software synchronization mechanism such as a critical section. Solutions herein are optimistic, non-blocking, and lockless (i.e. without locking). Non-blocking operation occurs without locking, waiting, nor deadlocking as discussed below.

As discussed above, PMEM may store metadata including pointers that point to block addresses in PMEM. Because PMEM is byte addressable and because PMEM and DRAM reside in a same address space, such pointers may be copied into DRAM from metadata in PMEM. In that way, a database block may be shallow copied into DRAM without actually copying the content of the database block. Thus, DRAM may contain pointers into PMEM.

A data block manager such as a buffer cache may leverage such pointer flexibility as follows. For example, a buffer cache may contain a mix of directly and indirectly available PMEM data blocks. Content of some versions of some PMEM data blocks may be copied and cached in DRAM buffers of the buffer cache that are directly available so that readers or writers need not access PMEM. Other versions of same or other PMEM data blocks are indirectly available when the buffer cache merely contains pointers for byte addressing into PMEM instead of buffered copies of the content of those versions of PMEM data blocks.

Database files in PMEM may be directly accessed by readers or writers that have the PMEM block addresses. PMEM addresses may be obtained from PMEM metadata from a buffer cache. When the DBMS needs to query data, it may read data directly from PMEM. For example, a table scan may cause the buffer cache to shallow copy PMEM blocks by copying their PMEM block addresses and provide those PMEM addresses to the reader that executes the query. That may increase DBMS throughput in two ways. First, the table scan does not thrash the buffer cache, which would impede concurrent queries that compete for available cache buffers. Second, most or all cache management activity is avoided because the reader may use unbuffered PMEM byte addressing for all of the data blocks of the scanned table.

As explained above, same pointers to same PMEM data blocks may be simultaneously available from both of PMEM and the buffer cache. In an embodiment, obtaining PMEM pointers from DRAM and the buffer cache is faster and/or simpler, as described herein, than obtaining pointers from metadata in PMEM.

As explained herein a reader obtaining, from metadata in PMEM, a data block pointer that is stored deep within a tree of metadata PMEM blocks, may need more or less unbounded worst case time to reliably obtain due to retries needing to traverse again the metadata tree when concurrent metadata writers repeatedly interfere with the metadata reader. During a table scan, a reader that obtains, from the metadata tree in PMEM, a sequence of pointers to logically sequential, but possibly physically nonadjacent, multiple data blocks may be somewhat more likely to collide with a metadata writer. Thus, the reader instead obtaining PMEM pointers that are already available from the buffer cache may accelerate a table scan or other query.

When the reader requests a data block pointer from the buffer cache, a pointer to a DRAM buffer already filled with content may be returned to the reader. Otherwise, the buffer cache may return a PMEM pointer for byte addressing the data block in PMEM. In either case, the reader may generally use the pointer without caring whether the pointer addresses DRAM or PMEM. For example, by using the buffer cache to obtain data block pointers, a table scan may sometimes entail a mix of block addresses into PMEM and DRAM such as when the scanned table was already partially cached.

Even without a buffer cache, FsDirect allows a process to write a block in PMEM while another process reads the previous version of the same block in PMEM. That avoids deadlock in a directly mapped PMEM database. More details of the deadlock problem are provided herein.

FsDirect provides database block versions, which is a coarser granularity than versions of individual table rows. In an embodiment, a database buffer cache that aggregates row level reads from database queries need increment a block reference count only once for multiple database queries. In an embodiment, FsDirect can shrink a datafile which involves challenges for versioned PMEM blocks, and those challenges are not present for multiple row versions in DRAM.

In an embodiment, a computer hosts a DBMS. A reader process of the DBMS obtains, without locking and from metadata in PMEM, a first memory address for directly accessing a current version, which is a particular version, of a database block in PMEM. Concurrently and without locking: a) the reader process reads the particular version of the database block in the PMEM, and b) a writer process of the DBMS replaces, in the metadata in PMEM, the first memory address with a second memory address for directly accessing a new version of the database block in the PMEM.

In an embodiment, a computer performs without locking: a) storing, in byte addressable PMEM, a database block, b) copying into DRAM, or reading, an image of the database block, and c) detecting whether or not the image of the database block is torn.

1.0 Example Computer

FIG. 1 is a block diagram that depicts an example computer 100, in an embodiment. Computer 100 isolates versions 131-132 of a same database block in byte addressable persistent memory (PMEM) 120 to mitigate access conflicts. Computer 100 may be a rack server such as a blade, a personal computer, a mainframe, a virtual computer, or other computing device.

Computer 100 hosts database management system (DBMS) 110 that may be a relational DBMS (RDBMS) or other tabular database, a columnar database or column store, a document database such as for JavaScript object notation (JSON) or extensible markup language (XML), a tuple store such as a resource description framework (RDF) triplestore, or other storage middleware that manages bulk data storage.

A database block is the unit of bulk persistence for DBMS 110 that may manage storage of many database blocks, including one or more versions of each database block such as versions 131-132 of a same database block. DBMS 110 may manage one or more databases, each of which contains its own set of database blocks that are not shared between databases.

DBMS 110 uses byte addressable PMEM 120 as non-volatile storage for data durability. PMEM 120 may be connected to a central processing unit (CPU) of computer 100 by a memory bus, which differs from older forms of non-volatile random access memory (NVRAM) that would instead be connected to a motherboard backplane of computer 100 such as a peripheral expansion bus. Thus, PMEM 120 may be part of the physical memory of computer 100 that may also include dynamic RAM (DRAM). For example, some or all of an address space in virtual memory (VM) of computer 100 may map to PMEM 120, DRAM, or both.

Byte addressability means that memory instructions of an instruction set architecture (ISA) of the CPU of computer 100, such as load and store instructions, may reference and directly access PMEM 120 for a small amount of data such as a single unaligned byte, a machine word or other small sequence of bytes, and/or an aligned memory page of hundreds or thousands of bytes. Directly accessing may include loading a line of PMEM into a hardware cache as discussed below, similar or identical to the way data is accessed in DRAM by a CPU. A direct memory access (DMA) controller may use PMEM 120 in more or less a same way as any memory chip or bank, such as for a block transfer (BLT).

However, PMEM 120 is not a block device nor a peripheral or other external device. PMEM 120 can be used without an input/output (I/O) device driver and without I/O system calls, which would be an order of magnitude slower than DMA. PMEM 120 is suitable for address interface standards such as direct access (DAX). In an embodiment such as with Intel's Optane, PMEM 120 is based on three dimensional (3D) NAND chip(s).

In an embodiment, all database blocks of a database are stored in PMEM 120 such that the database is both durable and entirely memory resident in a single storage tier without necessarily copying data. Thus, the database may be operated an order of magnitude faster than with a solid state drive (SSD) and multiple orders of magnitude faster than with mechanical disks. Because PMEM 120 is non-volatile, DBMS 110 may use PMEM 120 alone for atomic consistent isolated durable (ACID) transactions or in conjunction with scratch DRAM for even faster ACID transactions. Although a DRAM database cache is presented later herein for acceleration, ordinary operation of the CPU of computer 100 may contain, in an on-chip CPU cache such as L1 or L2, content directly from PMEM 120, thus bypassing DRAM chips.

In operation, DBMS 110 accesses versions of database blocks such as 131-132 that persist in PMEM 120 as addressable regions of physical and/or virtual memory. Although computer 100 is a single computer, DBMS 110 has concurrency such as multithreading or multiprocessing supported by infrastructure such as multiple CPUs, multicore, hyperthreading, or uniprocessor context switching such as preemption. For example, DBMS 110 may contain many execution threads or operating system (OS) processes, such as data access processes 150 and 160 that may be threads or processes.

Although PMEM 120 may provide atomicity at a fine granularity such as a machine word, PMEM 120 need not guarantee consistency for data aggregation such as a database block. Reader process 150 may need many clock cycles and/or CPU instructions to fully read and process current version 131 of a database block. Although not shown, writer process 160 may update the same current version 131 of the same database block. If those data accesses by processes 150 and 160 overlap, then reader process 150 may read a torn database block that incoherently includes portions of the database block whose contents respectively reflect before and after the update, which may be syntactically or semantically catastrophic.

Thus, DBMS 110 should be able to isolate reads from writes of a same database block, which is facilitated by persistent metadata 170 that contains pointers to block addresses in PMEM 120 for latest respective versions of all persisted database blocks. In an embodiment, metadata 170 also indicates addresses in PMEM 120 of older version(s) of database blocks. Before writer process 160 updates a database block, metadata 170 may already indicate that the latest version of the database block resides at memory address 141 that points to current version 131 in PMEM 120.

Maintenance of metadata 170 should occur when revising the database block as follows. Writer process 160 may update the database block by creating and populating new version 132 of the same database block. That is, respective memory addresses 141-142 of PMEM 120 may simultaneously contain respective versions 131-132 of the database block. Additionally, metadata 170's pointer to the latest version of the database block should be reassigned to point to memory address 142 that stores new version 132, which completes the update of the database block. An example algorithm for such an update is discussed below for FIG. 2, including an explanation of processing that occurs at shown times T1-T2.

2.0 Example Datablock Versioning Process

Figure 2:
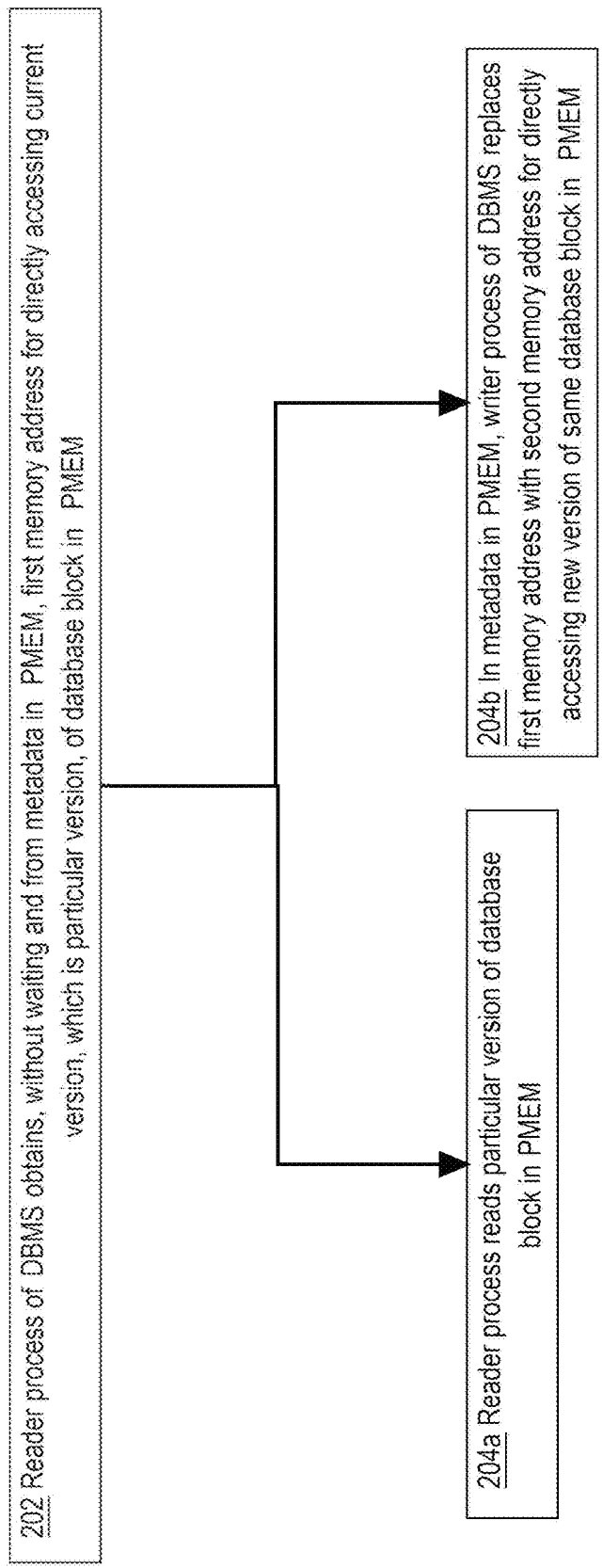
FIG. 2 is a flow diagram that depicts an example computer process for isolating different versions of a same database block in byte addressable persistent memory (PMEM) to mitigate access conflicts.

FIG. 2 is a flow diagram that depicts an example process for isolating versions 131-132 of a same database block in byte addressable PMEM 120 to mitigate access conflicts. FIG. 2 is discussed with reference to FIG. 1.

All of steps 202 and 204*a-b* occur without locking and thus without waiting to acquire an unavailable lock. Step 202 finishes before step 204 starts. Step 204*a-b* may occur in any relative ordering, including fully or partially overlapping.

Step 202 occurs during time T1. In step 202, reader process 150 obtains, without waiting and from metadata 170 in PMEM 120, memory address 141 for directly accessing the latest version, which at time T1 is current version 131, of a database block in PMEM 120. That is in step 202, reader process 150 obtains memory address 141 as a pointer to current version 131. For example, reader process 150 may directly read metadata 170 to obtain memory address 141. In other words, reader process 150 prepares to read the latest version of the database block.

Step 202 retrieves a pointer from metadata 170 in PMEM 120 without software synchronization. Thus, step 202 does not block or otherwise wait. Likewise, each of steps 204*a-b* need no software synchronization and do not wait. Because versions 131-132 of the same database block are isolated from each other, steps 204*a-b* do not interfere with each other.

Step 204*a* may begin before, during, or after time T2 and may finish before, during, or after time T2. Step 204*a* may take as long as reader process 150 needs to read and optionally process current version 131 of the database block. In an embodiment, time needed to process current version 131 and finish step 204*a* may be more or less unbounded.

For example, reader process 150 may read and process some bytes of current version 131 and then wait for I/O (IOWAIT) such as needed for other network or disk activity that is not part of physically reading current version 131, but is part of processing what content is read. Thus, step 204*a* may repeatedly alternate between reading a portion of current version 131 and processing a portion of current version 131. Even though processing current version 131 may include IOWAIT, other waiting such as synchronization, and/or other latency, physical reading of part or all of current version 131 is unsynchronized and non-blocking.

Steps 204*a-b* need not temporally overlap, and either step 204*a-b* may begin and finish before the other. However, computer 100 is configured to tolerate simultaneity of steps 204*a-b*. In other words, computer 100 accommodates contention between an ongoing reader and a sudden intervening writer as follows.

Such contention is accommodated by, at least temporarily, storing multiple versions 131-132 of a same database block that are respectively used by the reader and the writer. Thus, the reader and writer are more or less decoupled from each other and do not interfere with each other. Although the reader and writer may temporally overlap, an amount of overlap and a relative temporal ordering of various reading and writing activities may differ across examples as follows.

Writer process 160 allocates and populates new version 132 of the same database block in PMEM 120, beginning any time before step 204*b* at time T2, such as: a) during step 204*a*, b) between steps 202 and 204*a*, c) during step 202 at time T1, or d) before step 202 and time T1. Writer process 160 replaces, in metadata 170 in PMEM 120, memory address 141 with memory address 142 for directly accessing new version 132 of the same database block in PMEM 120 during step 204*b* at time T2. In an embodiment, PMEM 120 guarantees that pointer reassignment by step 204*b* is atomic as discussed later herein. After step 204*b*, metadata 170 indicates that memory address 142 points to the latest version of the database block, which is new version 132.

In that way, the database block is revised, and new version 132 replaces version 131 as the latest version of the database block. However, version 131 may indefinitely remain in PMEM 120. Whether or not version 131 is unusably obsolete depends on the scenario of reader process 150 and/or the semantics of DBMS 110.

At a minimum, version 131 should remain available while still being read. Depending on the example and embodiment, version 131 is: a) discarded immediately after step 204*a* if reader process 150 was the last remaining reader of version 131, b) discarded after all of multiple readers finish reading version 131, c) discarded when adjustment of a reference count for version 131 indicates no more readers, or d) discarded immediately after being unpinned as discussed later herein. In an embodiment, discarding version 131 may be deferred even after version 131 is eligible to be discarded. In an embodiment, version 131 remains available until reclamation is needed for any purpose by PMEM 120, which may or may not be for creating a new version of a same or different database block.

For example, DBMS 110 may provide ACID transactions as well as various levels of relaxed isolation consistency that may improve throughput of DBMS 110 and/or of reader process 150, including serialized reads, repeatable reads, and reads of committed and/or uncommitted data. For example, reader process 150 may tolerate dirty reads, non-repeatable reads, and/or phantom reads. However, an optimistic and/or fully isolated transaction of reader process 150 may expect that reader process 150 continues to use version 131 despite availability of new version 132.

PMEM 120 does not itself manage versions of database blocks. As presented later herein, DBMS 110 has techniques for version management of database blocks, including a full lifecycle of a database block such as memory management. As presented later herein, DBMS 110 may cache versions of database blocks in DRAM so that readers and writers that fulfill client commands need not directly access PMEM 120 in some scenarios.

3.0 Example Database Block Access Process

Figure 3:
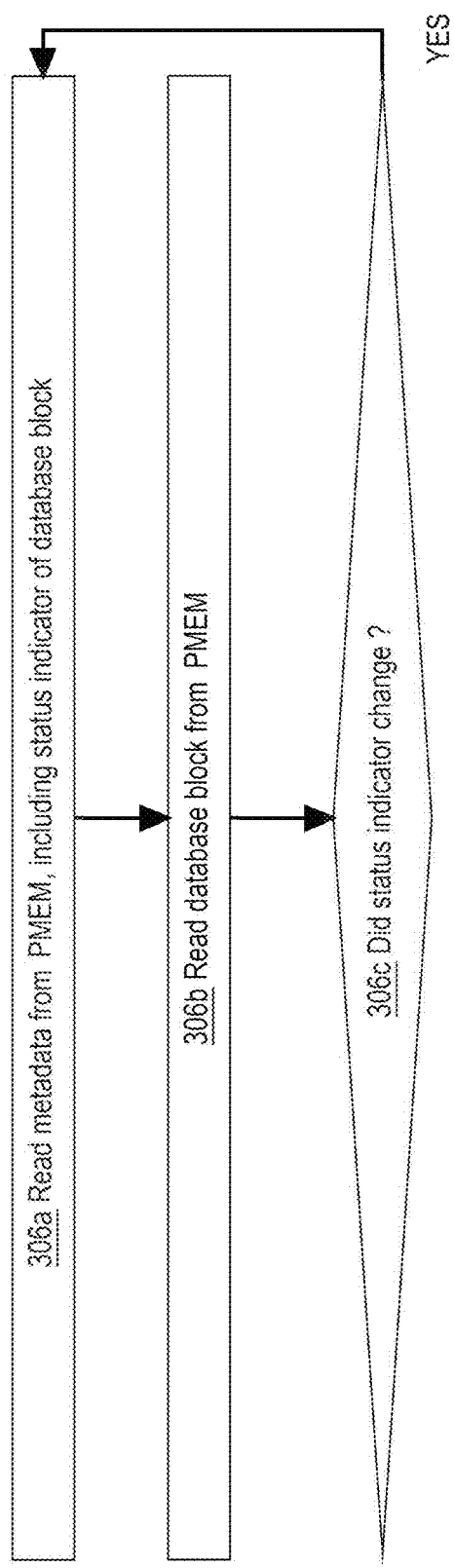
FIG. 3 is a flow diagram that depicts example computer activities that may occur as part of reading a version of a database block in PMEM.

FIG. 3 is a flow diagram that depicts example activities that may occur as part of reading version 131 of a database block in PMEM 120. FIG. 3 is discussed with reference to FIGS. 1-2.

In an embodiment, reader process 150 reads version 131 of the database block in PMEM 120 by using some form of: memory mapped I/O, byte addressable direct access (DAX) to hardware, and/or a filesystem in userspace (FUSE). At the lowest level, such as the hardware level, DBMS 110 performs a byte addressed read of version 131 in PMEM 120 such as described here and earlier herein. For example, DBMS 110 may execute: a) memory load instruction(s) that directly copy some or all of version 131's content from PMEM 120 into CPU register(s), and/or b) memory move instructions or block transfer (BLT) instructions that directly copy some or all of version 131's content from PMEM 120 into DRAM. DRAM database block caching is presented later herein.

Unlike some approaches, techniques herein have a constraint on how version 131 of the database block is read from PMEM 120. DBMS 110 does not use a block device driver nor a block-oriented I/O system call of an operating system (OS). Regardless of how reading PMEM 120 is optionally wrapped in additional software such as FUSE, physical reading of PMEM 120 is actually accomplished by byte addressable memory instructions of a CPU's instruction set architecture (ISA).

Steps 306*a-c* detect that a torn or stale block was read, which is tolerable, recoverable, or otherwise manageable if detected and potentially catastrophic if undetected. There are various implementations, especially because a status indicator in metadata 170 may have different implementations with somewhat different semantics as follows. As discussed earlier herein, each database block may have its own metadata in metadata 170, such as a pointer to a latest version, such as memory address 141. Additionally in metadata 170, a database block may have a respective status indicator that may be a Boolean flag or an unsigned integer version counter. In an embodiment, the version counter may be stored as a signed integer with the sign having additional semantics as discussed later herein.

Regardless of how the status indicator is implemented, it is read from metadata 170 during step 306*a*, which may be part of step 202 of FIG. 2. In an embodiment not shown, step 306*a* may include a decision step that detects that the status indicator indicates that the database block is unready to be read. For example, a negative version counter may indicate that version 131 is currently being replaced by new version 132 or that version 131 is currently being directly updated. In the shown embodiment, the status indicator may be copied out of metadata 170 during step 306*a* for eventual inspection by a later step such as 306*c*.

Step 306*b* reads version 131 from PMEM 120. For example, version 131 may be copied into DRAM. However, even a seemingly straightforward and compact activity such as quickly copying version 131 into DRAM may more or less temporally collide with a write to a same or newer version of the same database block.

Thus, the copy in DRAM might be torn or stale. An integrity checksum would make a tear evident. However, an integrity checksum would need sequential processing of some or all bytes in the database block, which is slow, especially since the checksum would need calculating twice: a) when version 131 was originally written (which is not an update), and b) after reading version 131 (in case of an intervening update). Thus, no checksum is needed for steps 306*a-c*, although the database block may have a checksum for other purposes.

Step 306*c* detects a torn or stale copy by rereading the database block's status indicator from metadata 170. If the reread value matches the previous value read in step 306*a*, then the DRAM copy of the database block is not torn and, for now, is not stale. If the values do not match, then the database block is torn or stale. A tear or staleness may be distinguished from each other in various embodiments such as in the following ways.

In one example, the status indicator is a signed integer version counter, and a writer directly alters version 131 in PMEM 120 without creating new version 132. Immediately before altering version 131, the writer sets the sign of the integer to negative in metadata 170. After altering version 131, the writer restores the positive sign in metadata 170. If a reader in step 306*c* observes the negative sign, then the DRAM copy is torn, and the database block should be reread, which includes repeating all of steps 306*a-c* and step 202 of FIG. 2.

An embodiment that creates new version 132 writing may more or less guarantee that reading any version of the same database block will not be torn. In that case, any mismatch of values observed in step 306*c* indicates that the DRAM copy is stale, which may be tolerable or may be recoverable such as by repeating all of steps 306*a-c* and step 202 of FIG. 2.

Although not shown, two writes may collide. More lockless techniques presented later herein are robust enough to manage concurrent writes and avoid torn writes. Lockless techniques presented above and later herein are sufficient to provide various fundamentally enabling guarantees such as: a) no tears, b) detected tears, and/or c) detected staleness. Thus compared to the state of the art, DBMS 110 has reduced latency and/or increased integrity. Data integrity may be important for DRAM caching of database blocks as presented later herein.

4.0 Example Block Management Activities

Figure 4:
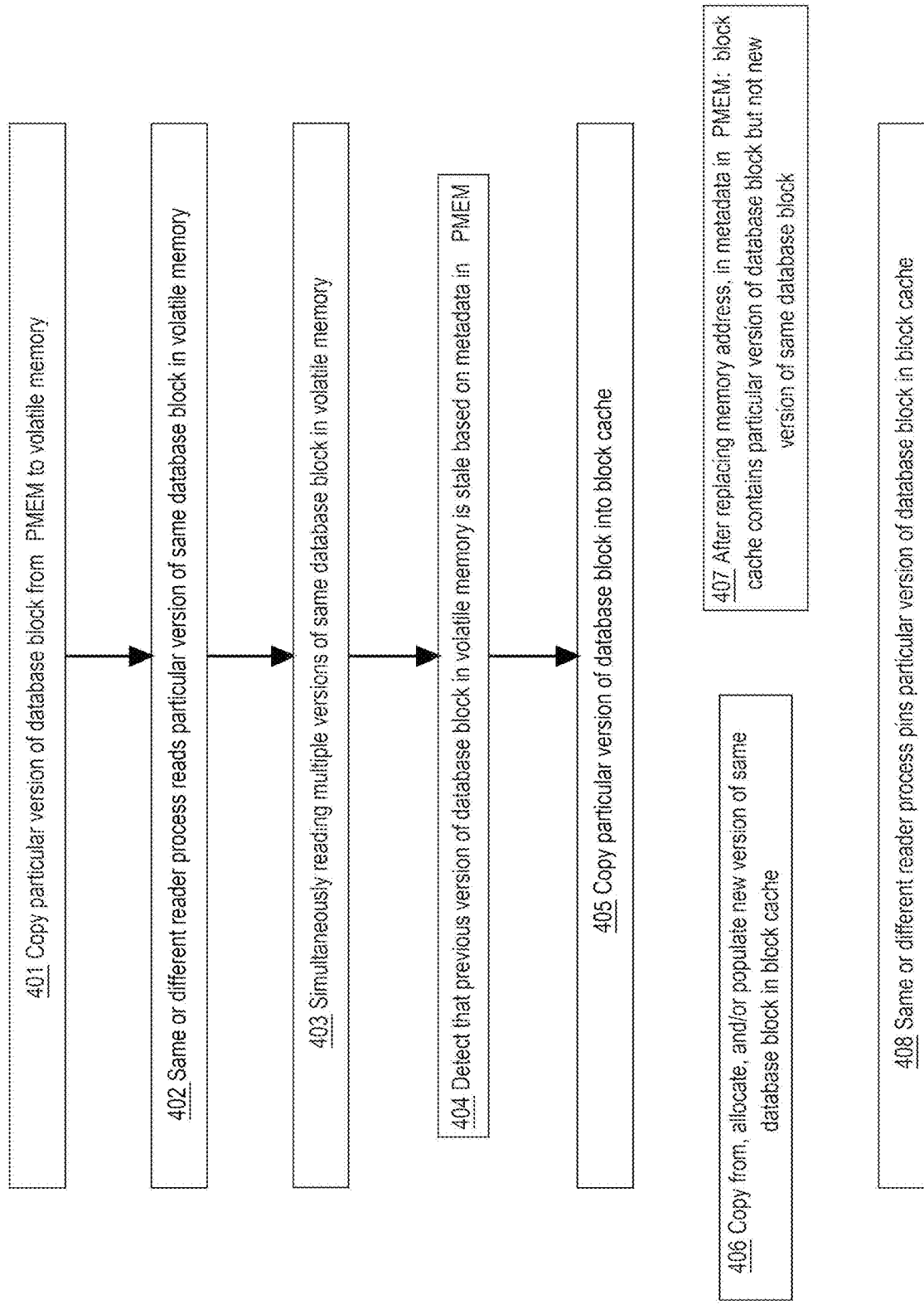
FIG. 4 is a flow diagram that depicts example database block management activities.

FIG. 4 is a flow diagram that depicts example database block management activities. FIG. 4 is discussed with reference to FIG. 1. The steps of FIG. 4 may occur in various orderings and/or combinations.

A reader may repeatedly read a same version of a database block in PMEM. However, volatile memory may be faster than PMEM, which encourages local copies of same or different versions of the database block. A read only copy of a database block may need less lifecycle management. For various reasons, copying a database block into volatile memory may be important.

Step 401 may copy any version of a database block from PMEM to volatile memory, so long as the reader has the address of a particular version in PMEM. If the reader does not have that address, then only the address of the latest version may be available in metadata 170.

Each of PMEM and DRAM may simultaneously contain same or different multiple versions of a database block. A same version of the database block in PMEM or DRAM may have multiple readers, shown as step 402, for which the multiple readers may be concurrent or not.

Different readers may simultaneously read different respective versions of a same database block in PMEM or DRAM, shown as step 403. Because metadata 170 in PMEM 120 indicates the address in PMEM 120 of the latest version of a database block, a particular version of that database block may always be detected as stale or not by consulting metadata 170, so long as the address of the particular version in PMEM 120 is known, shown as step 404.

Version management and copy management for database blocks may be centralized and enforced by a controller of a database block cache in DRAM of DBMS 110, which may facilitate sharing and increase throughput. Step 405 copies a particular version or a latest version of a database block from PMEM to the cache. Cache metadata may indicate which version(s) of which database blocks are cached. The cache may accept a lookup key for retrieving a version of a database block from the cache and, if not already cached, copy that version of the database block from PMEM to cache. Depending on the embodiment, the cache lookup key may be a version number, a version alias such as latest or previous, and/or a PMEM address of a block version. In an embodiment, the cache may retain a version that was already deleted from PMEM.

Step 406-407 are alternate ways in which a new version of a database block may (step 406) or may not (step 407) be cached. Step 406 copies from, allocates, and/or populates a new version of same database block in a block cache. For example, a new version may be a clone of a previous version, cached or not, or may be populated from scratch with newly generated content, such as when a writer creates and stores a blank version of a database block in the block cache. Whether the new version is or is not (e.g. yet) stored in PMEM, the new version in the block cache may be read by any process that has the lookup key for the new version in the block cache which, until the new version is stored in PMEM 120 and addressed by metadata 170, might only be the same process that created the new version. In other words a new version, which is as yet only cached and/or persisted but not addressed in metadata 170, may have reduced or no visibility from other processes.

Step 407 may be a consequence of skipping step 406. Step 407 is a state, not an activity. After storing the new version in PMEM 120 and replacing, in metadata 170 in PMEM 120, the previous PMEM address of the database block with the PMEM address of the new version, at step 407 the block cache may still contain a previous version of the database block but not the new version of the same database block. For example, the new version may have bypassed the cache. Thus, the block cache may be stale with regard to that database block. Ways to prevent, detect, and/or recover from a stale block cache are presented later herein.

The block cache may have an eviction policy such as least recently used (LRU) or variations such as presented later herein. As a generalized component, the eviction policy may be suboptimal in some scenarios. To indefinitely prevent eviction of a particular version of a database block, the particular version may be pinned in the block cache. In step 408, the particular version may become pinned by a same or different reader or writer process that loaded or created the particular version in the block cache.

5.0 Example Embodiments

The following are example embodiments, each of which may be an implementation of computer 100 of FIG. 1. These embodiments may include technology choices based on development or operation scenarios with concerns such as convenience or optimality. Features presented for the following embodiments may be optional or unnecessary for embodiments already presented above.

In an embodiment, computer(s) such as a rack server or a smartphone host a database management system (DBMS) that includes FsDirect as discussed herein. In an embodiment, FsDirect is a single-database user-level file system designed for operating a database on persistent memory (PMEM) of the computer. Besides creation and configuration of the file store, the external interface of FsDirect is similar to a native file system. For example on Linux, FsDirect supports the following:

Directories
Normal Linux file paths
Normal file system commands such as ls, cd, etc.
Using native operating system (OS) cp command to copy files from and to a FsDirect file store The creation of a FsDirect file store is different from creating a typical file system. While a typical file system uses raw storage as its backing store, FsDirect is created out of a native OS file, such as a large ext4 file on Linux. On Linux, the FsDirect backing store file should be in an ext4 or XFS file system mounted with direct access (DAX) mode or in a native DAX device, for faster and direct access to PMEM.

To enable the DBMS to directly access PMEM in an embodiment, a FsDirect file store should not be shared by multiple databases. In an embodiment, there should be at least one FsDirect file store created for each database of the DBMS. The reason for this restriction is for corruption isolation. By restricting one FsDirect file store for each database, a bug in one database caused by a process following a stray pointer will not corrupt another database.

In an embodiment, the FsDirect file store is created by starting a DBMS server in nomount mode and issuing a structured query language (SQL) command that provides a root mount point for the file store and a path to the ext4 backing file, as explained later herein.

The FsDirect file store provides the following value beyond the native direct access (DAX) mode of the native file system. FsDirect guarantees I/O atomicity for writing database data. In other words, FsDirect avoids torn writes. Torn writes are possible in a native file system mounted in DAX mode. DBMSs herein require the underlying file system to avoid torn writes. FsDirect uses memory copy (memcpy) to perform I/O, avoiding expensive operating system calls into an application program interface (API) for file or device IO.

FsDirect enables the DBMS to directly read from PMEM for queries, with or without copying data into a DRAM buffer cache first. There are three advantages for a database to directly read from PMEM:

Direct reads avoid duplicating local data in a database buffer cache because the data is already in (i.e. persistent) memory. That benefit saves memory.

Direct reads avoid I/O. The reason FsDirect enables direct reads from PMEM is to allow one process to write a block while another process concurrently reads a previous version of the same block on PMEM. This avoids the risk of deadlocks for the database.

Direct reads let a relational DBMS (RDBMS) read less than a whole block of data. For example, direct read can access a single table row of as bytes within a larger (e.g. 8 KB) block.

FsDirect introduces a new paradigm to create, manage and use database files to store and retrieve data using PMEM as the underlying storage media. FsDirect offers the following features.

Hierarchical directory tree of files
Hard links from multiple directory entries to the same file.
File system can grow and shrink as needed by resizing the underlying EXT4 file.
Supports all Oracle file types accessed through an existing database file access API such as ksfd.
Atomic writes of file blocks.
Read from PMEM via memcpy with no locking.

Logical block sizes of 2K, 4K, 8K, 16K and 32K are supported.

All files in a single FsDirect file system have the same physical block size.

Supports application reference holds on individual physical blocks.

Allows getting pointer to physical blocks in PMEM for direct access. (Implies reference hold)

Optimized for Oracle File I/O semantics.

Maintains Oracle file type information.

Can use a DAX enabled PMEM volume.

Enables filesystem in userspace (FUSE) access for utilities such as DUL and DBverify. A FUSE protocol implementation provides abilities for existing utilities to access database files through the OS No permissions to configure. OS implements permissions for underlying PMEM file.

No redundancy within the file system. Presumed that DataGuard is used for high availability.

Only one database instance can access a given Direct FS file store.

One database instance can mount several FsDirect file stores.

5.1 Example Buffer Cache in Example Database Server

A DBMS has internal processes or threads of execution that execute client requests. Each such client process (a.k.a. client) may be a reader or a writer of a database block. Clients read and modify database blocks through a buffer cache for acceleration because DRAM is faster than PMEM. A buffer in a DRAM buffer cache may represent either the most up-to-date version of the block, or a Consistent Read (a snapshot as of a past point in time) version of the block.

Clients call into the buffer cache application program interface (API) to pin a database block. Once the buffer containing contents of the block is pinned, clients directly access contents of the block using the buffer's virtual address. The virtual address could be pointing to a region in DRAM or PMEM depending on the type of buffer. For example instead of buffers as cache entries, an entry may be a so-called header that points to a buffer/block in DRAM or PMEM. That is, the buffer cache may have indirection. Multiple buffers of the same database address with different virtual address references to different versions of the block may exist and be shared across various logic layers above the buffer cache.

In an embodiment, the buffer cache stores respective buffer headers for version(s) of various blocks. Each header may contain a PMEM address if the corresponding version of the block resides in PMEM. Each header may contain a DRAM address if the corresponding version of the block resides in DRAM. Thus, a buffer header may have one or two pointers to respective copies of a same version of a same block. Techniques for creating and using buffer headers, using their pointers to access block content in PMEM or DRAM, and copying content between PMEM and DRAM are presented in related patent application Ser. No. 15/693,273, which refers to such pointers as mappings.

Clients may pin the buffer for an arbitrary amount of time, which ultimately might depend on database client activity. There might be no reliable mechanism available to force the client to unpin the buffer or invalidate any virtual address references (i.e. dangling pointers) to that buffer. In any case when a writer suddenly creates in PMEM a new version of the buffered block, the PMEM's pointer tree (explained later herein) is updated to point to the new version, but the buffer cache need not be updated to point to the new version.

Instead, the buffer cache may continue to refer to the stale version in DRAM. Only for a new reader will the buffer cache revisit the PMEM pointer tree to discover the new version of the block, in which case the buffer cache may also copy the new version into buffer cache. In that case, there may simultaneously be multiple versions of a same database block in buffer cache.

In an embodiment, the buffer cache reference counts readers of a cached block. The buffer cache's policy evicts unreferenced (i.e. zero count) blocks, such as according to least recently used (LRU). In an embodiment, the cache policy evicts unreferenced stale (i.e. old version) blocks before unreferenced current blocks.

As explained earlier herein, the buffer cache may retain the content and/or PMEM address of a version of a database block. In an embodiment, the buffer cache retains the PMEM address of the version of the database block, even after that version is evicted from the buffer cache. In that way, the version of the database block may be cached as a deep copy before eviction, and as a shallow copy after eviction.

For example, a recently unreferenced stale block is evicted before a less recently unreferenced current block. In an embodiment, a writer informs the buffer cache, even if the writer does not intend to place the new version into the buffer cache, and even if the old version is not in the buffer cache. Thus in such an embodiment, the buffer cache may contain metadata that always tracks whether or not a cached block is current or stale, even when the new version of the block in PMEM bypasses the buffer cache as described earlier herein.

In another embodiment, the buffer cache metadata may itself become stale such that a cached version of a block is indicated by the cache metadata to be stale only when a more recent version is or was cached and not when the more recent version bypasses the cache. For example, the caching policy may prioritize eviction of unreferenced blocks by first evicting known stale versions, then versions of unknown status, and lastly evicting current versions. In an embodiment, the buffer cache is informed by FsDirect that there are too many stale blocks with references, which may risk running out of PMEM space. Thus, the buffer cache may proactively forfeit old references by evicting least recently used buffers out of cache.

The DBMS uses a Consistent Read transaction model that ensures that a reader never blocks a writer. When a writer encounters a read pin on the buffer it wants to modify, it clones that buffer by copying its content to a new buffer in DRAM and modifies the newly created clone. The new buffer may become the most up-to-date version of the database block, and the source (i.e. previous) buffer in the clone operation is tagged as a snapshot copy which the reader continues to pin indefinitely. Once the writer has updated the most up-to-date version of the database block in DRAM, the DBMS may need to write that version to PMEM. For example for checkpointing purposes, the database may persistently write changed blocks.

That presents a problem in the case of directly mapped byte-addressable PMEM. So long as there is a reader for a given database block (directly accessing a given PMEM byte range through its virtual address), a writer must not modify the contents of that block. A filesystem implementation which allows clients to directly reference PMEM through a mapped virtual address should: (a) maintain multiple versions of a given file block, and (b) track whether or there is an outstanding direct map reference for a given file block.

A writer modifying the contents of a directly mapped block is not a problem, because the change can be done in a DRAM clone of the block. A problem may be that a checkpoint can not write the new version of the block to PMEM because some readers are directly reading the block on PMEM. That is one reason why versioning in FsDirect helps. A database checkpoint is a mechanism during which the database writes changed blocks from DRAM to persistent storage, to make sure these changes are persistent and do not need recovery if the DBMS crashes.

The DBMS will write/read data to files exposed by FsDirect via load/store and/or memcpy. Unlike other storage schemes that copy data between DRAM buffers owned by the database client and a storage subsystem like that of a spinning disk, FsDirect enables storage on PMEM chips to be directly accessed from memory owned by FsDirect and mapped in the virtual address space of the database instance.

Herein, a data block may be a database block. Allocation on write "relocates" the address for a data block. For a given file and a data block within, a physical memory address within PMEM is mapped into a process's virtual address space. With a tree of pointer blocks anchored to an index node (inode) presented later herein, metadata of a file maintains pointers to leaf blocks that contain portions of the file.

Even though a block may have multiple versions in PMEM, metadata of the file can either point to the latest (updated) version or the previous (stale) version. The file never points to both of the versions, since file metadata accommodates only one version pointer. In any case, pointers between inodes and blocks are stored in PMEM as relative offsets for byte addressing.

In one embodiment, each client process memory maps a same PMEM address to a same virtual address, such that for all client processes there is only one same virtual address for that PMEM address. PMEM addresses are stored as relative byte offsets between referring and referred PMEM blocks, and such relative addresses are amenable to identical virtual address mappings for multiple client processes without changing the relative byte distances between blocks. Such inter-block relative addressing is self-relative addressing.

In another embodiment, each client process can memory map a same PMEM address to a respective different virtual address. For example, two client processes may have two different respective virtual addresses that map to a same PMEM address. Self-relative addresses are amenable to similar virtual address mappings at different virtual base addresses without changing the relative byte distances between blocks.

Because relative addresses depend on which two blocks are related, two different PMEM blocks that point to a same third PMEM block may contain two different relative addresses to the same third block. Thus at the cost of pointer tree indirection as explained later herein, which occurs once per reader processing of a block, FsDirect provides PMEM addressing that is versioned and relocatable. Thus, different client processes can operate more or less independent of each other, which reduces synchronization, which reduces deadlock and increases concurrency and throughput.

A file is composed of potentially non-contiguous PMEM blocks. Thus regardless of whether database blocks are in DRAM or PMEM, pointer arithmetic is only guaranteed to be valid within a block and not across multiple blocks. For example when table rows have a fixed size, row iteration may occur within a block by pointer arithmetic such as incrementation. When row iteration eventually exhausts a block and needs to visit a next block, the row pointer should be reset (i.e. instead of incrementing) based on the address of the next block.

When a new version of a block is stored in PMEM, it replaces an old leaf block in the pointer tree as presented later herein. Thus, an inode or pointer block must reassign its pointer from the old version to the new version of the block. The pointer is reassigned a new offset value, which is the byte distance from the pointer block to the new version of the leaf block.

An advantage of offsets (i.e. relative addressing) is that an offset may need less space than a memory address. Such a smaller pointer increases the possibility that PMEM can atomically write a pointer, which may be required by FsDirect. For example, a non-atomic pointer write may cause the PMEM pointer itself to appear torn to a reader.

Discussed later herein is a flag that tells the reader that a collision occurred (i.e. a simultaneous write is in-progress). The reader uses that flag to detect a torn DRAM copy of a PMEM database block. The reader reads the PMEM flag, copies the data (i.e. snapshot/image) into the reader's DRAM buffer, and reads the flag again, to ensure that it has not been flipped by a sudden writer. An image of a database block is a snapshot or observance of the content of the database block. An image has a potential to be corrupted (i.e. torn) because the activity of reading the database block to obtain the image might be interfered by a simultaneous write to the database block. If a flipped flag is detected, then the DRAM copy is torn (i.e. corrupt), in which case the reader should repeat the read process, including copying the data again. That ensures that a block pointer points to consistent data, whether old or new data.

The DBMS does not delete the data block as a result of a read completing. The reader just reads (copies data to its own DRAM from PMEM) and continues processing without realizing it has data that has or has not become stale, and certainly not impacting any decision about deleting the old data block. For example, such buffered reads do not affect a read count on a PMEM block. While pinned in buffer cache or in PMEM, a reader can directly address a database block without pointer reassignment, either indefinitely or until the reader wants a latest version. With two concurrent readers of a same pinned block version, one reader may switch to a latest version while the other reader continues to use the stale pinned version.

Thus, the DBMS achieves more or less complete flexibility with regards to: a) how many stale versions to keep for a same block, and b) whether to keep a block version in buffer cache, in PMEM, and/or elsewhere in DRAM, such as DRAM of one process. Thus, the DBMS or the client process can freely decide whether or not to make a copy when reading a block. That is, the DBMS does not force a reader to make a copy. If the reader does not make a copy, the reader may instead pin the current version, either in buffer cache or in PMEM, and continue to directly use the pinned version even after a new version arises. Thus, what is pinned is: a) guaranteed to be a latest version when initially pinned, b) guaranteed to be directly addressable while staying pinned, but c) not guaranteed to remain a latest version while pinned. Under that consistency model for a same database block, ongoing readers and a sudden writer may concurrently operate without interference. Thus, data integrity of database blocks is guaranteed.

The reader follows a lockless code path, never needing to lock the database block, where locking and pinning are different actions. Locking is exclusive, and pinning is inclusive (i.e. shared). The reader reads available data. Staleness of data is somewhat immaterial to underlying reading mechanisms. The writer independently updates the data as a new version, which the reader may or may not eventually use, but there is no count of readers maintained. Thus, FsDirect avoids several performance bottlenecks:

1. There is no reader count.
2. There are no locks, such as required to either serialize readers and writers or to protect counts in (1) above.
3. A writer does not wait for an ongoing reader.
4. A sudden write does not interrupt an ongoing reader.
5. Reclamation of stale versions does not occur in the critical path of a read. Reclamation may instead be autonomous (i.e. background and/or deferred). Reclamation is not garbage collection, in the sense that there is no compaction.
6. Database blocks are not torn.

Two new types of operations are supported on FsDirect blocks depending on whether a given block is an existing block of a file. These operations result in a virtual address (i.e. pointer) of the filestore block to be made available to FsDirect clients (i.e. readers and writers in the DBMS), thereby allowing the clients to directly read or modify the contents of that block. FsDirect database block operations include retrieve, borrow, forfeit, return, and adopt, which operate as follows.

A RetrieveRef operation allows an FsDirect client to obtain a virtual address of a block of a file that was previously successfully written to. A borrow of a block, on the other hand, is an operation allowed on a file store block that is free. Once a virtual address of a filestore block is made available to the FsDirect client, ownership of that block is also transferred to the client. FsDirect will not be able to reuse contents of a held or borrowed block until its ownership is transferred back to FsDirect via ForfeitRef, Return, or Adopt operations.

RetrieveRef and ForfeitRef operations directly reference an allocated file block, whereas an Adopt operation, in addition to giving ownership of the block back to FsDirect, also causes that block to be incorporated into an existing file. Upon completing an Adopt operation on a borrowed block, the adopted block replaces the previous version of that file block. Borrow of a free file store block followed by Adopt of that block to inject it back in, is semantically identical to an overwrite of an existing block of a file.

5.2 Example Filesystem

FsDirect does not count readers. Instead, readers use one or more levels of pointer indirection, and eventually read data by copying content from PMEM to DRAM that belongs to a reader. In an embodiment, each database block has a block header that includes a block version number. The reader is satisfied with the data that was read (copied from PMEM to DRAM) if the block version number remains unchanged from before the data copy from PMEM until after the reader is finished processing the block. If the block version number changes during the read, the reader makes another attempt, including all of the pointer indirection.

Figure 5:
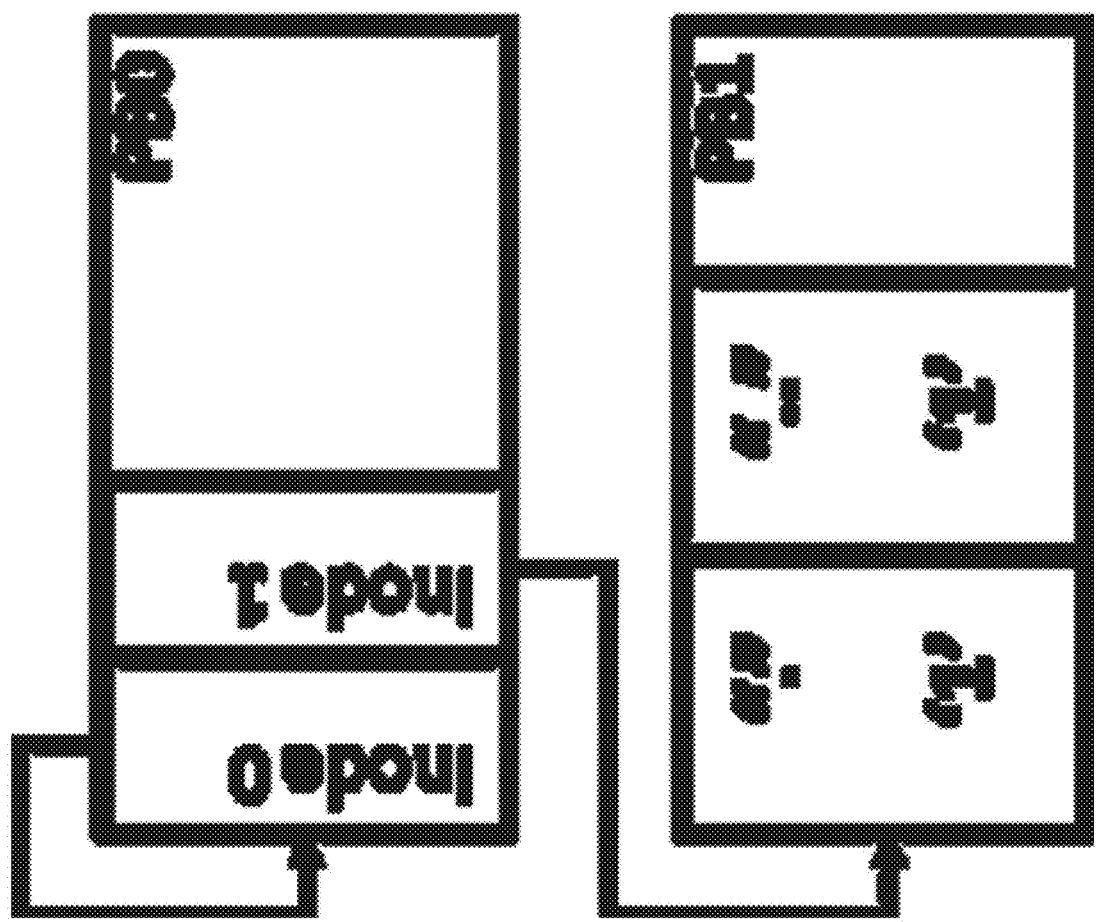
FIG. 5 is a block diagram that depicts an example root directory that may be the top of a directory tree of an FSDirect filesystem in PMEM.

FIG. 5 is a block diagram that depicts an example root directory 500, in an embodiment. Root directory 500 may be the top of a directory tree of an FSDirect filesystem in PMEM 120 in FIG. 1. In an embodiment, root directory 500 is part of metadata 170.

Because FsDirect implements a file system, every file or directory in FsDirect is described by an inode structure allocated to the file. The inode is used to manage the space consumed by the respective file or directory entries in a directory. The physical blocks in an FsDirect extent start with block 0 (zero) of the monolithic Inode File that contains all of the inodes for the FsDirect file system. An inode number is an index into this file. Root directory 500 is the root of the user-visible directory and file hierarchy within the FsDirect file system and is also represented by an inode.

A directory is a file that contains only the file names and inode numbers rather than database data. In an embodiment, directory entries are not sorted so file creation requires scanning the entire directory. This should be acceptable since file creation should be relatively rare and the directory always resides in PMEM. In an embodiment, a directory entry is always 64 bytes and contains the following.

An inode number of an inode that describes the corresponding file (zero if the entry is free).

The file name of that directory entry. The name is not null terminated, but is padded with trailing bytes cleared (zero'ed).

A directory block is simply an array of directory entries. Blocks are appended to a directory as needed. Deleted entries are reused if available. The first 2 entries in a directory are "." and ".." with the usual POSIX meaning.

When a FsDirect file system is created it contains the inode file and an empty root directory. Inode zero is reserved for the inode file itself, and inode 1 is reserved for the root directory. Physical block zero, thus, always contains block 0 of the inode file with inode zero and one in it. The root directory is empty so it only contains the entries for "." And "..". They both are entries for the root directory itself so they have a 1 for the inode number. Because both files are initially smaller than a block, the root block pointed to by the inode is the data block itself and the pointer tree depth is zero. Initially, all of the other physical blocks are on the free list that is explained later herein.

Figure 6:
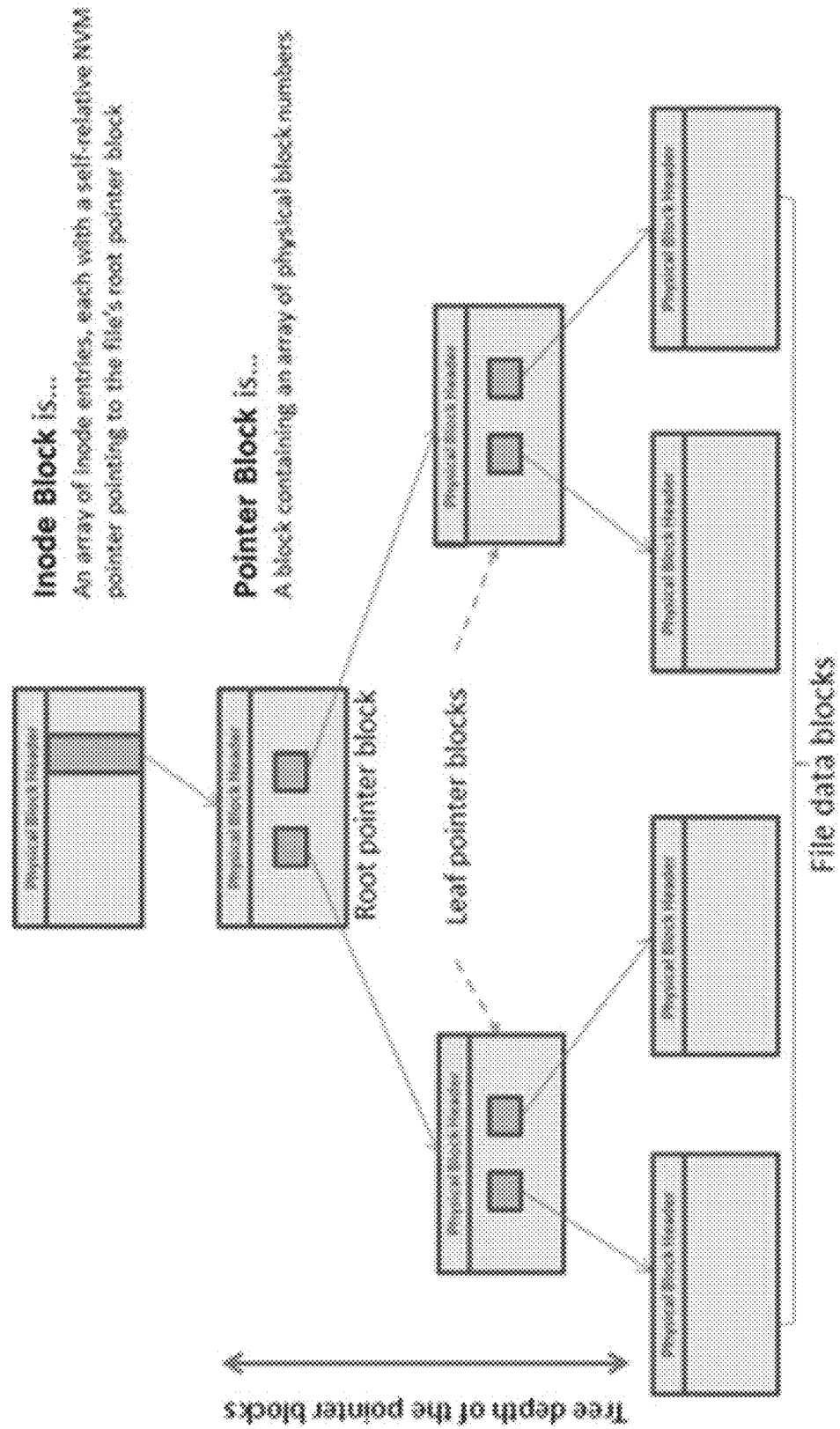
FIG. 6 is a block diagram that depicts an example file that contains a tree of blocks of data or metadata in PMEM.

FIG. 6 is a block diagram that depicts an example file 600, in an embodiment. File 600 contains a tree of blocks of data or metadata in PMEM 120 of FIG. 1.

The file root of every file larger than one block is a pointer block. In an embodiment, pointer blocks and/or inode blocks are part of metadata 170.

A pointer block just contains an array of self-relative PMEM pointers to physical blocks (other pointer blocks or data blocks). The pointer blocks for a file form a tree with the leaf pointer blocks pointing to blocks containing file data. The last pointer block at each level may have some null pointers for blocks that do not exist at the next level down. If the file gets too large so the root pointer block fills up, then a new block is allocated to be the new root pointer block with its first pointer being a pointer to the old root pointer block. In other words, the tree of pointer blocks grows at the root. A depth of zero means there is only one data block and the root pointer in the inode points at it. A depth of one means there is a single pointer block pointing to all the data blocks in the file. Shrinking a file does not reduce its depth. Note that pointer blocks are updated in place using PMEM transactions rather than doing an out of place write of a whole block and then doing a pointer switch. FIG. 6 shows how the blocks for a file with a pointer tree depth of two are navigated to from the file's inode.

Unlike disk storage, the database data is present in addressable memory, thanks to the leveraging of a direct access (DAX)-aware implementation. FsDirect, therefore, supports requesting the address of a file block in PMEM, which atomically increments the reference count on the physical block pointed at and stores its address in the caller's pointer. It is important to distinguish reference counting for PMEM from counting of readers, which does not occur. For example, multiple readers of a copy of a block in the DBMS's buffer cache are counted as only a single reference to the original block in PMEM. Thus, the buffer cache itself may operate as a client or caller, at least with regard to PMEM reference tracking.

When the caller (i.e. buffer cache) is done using the pointer, another call is required to decrement the PMEM reference count. A physical block with a non-zero reference count cannot be donated by a file system shrink from the current file system to another file system (in the case of a multitenancy in PMEM, not shown), marked bad due to a hardware issue, or be reused for another block. The reference count does not prevent the file block from being relocated to a different physical block due to a write request, shrink, or hardware problem. Note that write requests are expected to be sent to FsDirect via DRAM buffers which are copied to PMEM using a staging area in PMEM and the block pointers updated transactionally, freeing the original file block.

The buffer cache may keep references to some PMEM blocks for a long time, such as in a buffer header as described earlier herein. FsDirect is expected to retain the PMEM address of such a block. For example a frequently read block may be pointed at by a buffer in the buffer cache. The reference will last until the block ages out of the cache or is evicted from the cache. For such references, the client process can provide a release request callback, such as when the file is opened by the client. The callback is called with the file number and file block number when the physical block has moved and is no longer associated with the file block that was used to get its address. The callback is a hint that the reference should be released at the earliest opportunity.

When a referenced file block is written to, the existing physical block moves to the tail of a free list that is explained later herein. A referenced physical block is never allocated for use as long as a reference to the block exists. Care is taken to protect the free list from becoming empty as such a situation will result in a stall. This may lead to a required overprovisioning which can be controlled via FsDirect configuration settings.

A write occurs in two steps. A normal block write finds a free block of the correct size, puts a hold on it, copies data into it, and atomically pointer switches, in the pointer block, the old version of the file block with the new version when releasing the hold. FsDirect allows this to be broken up into two calls to the file system so that the new version can be constructed before its block number is known. The first call gets a reference to a free block. The second call switches it with a specific file block and releases the reference. This is useful for generating redo directly into PMEM and then deciding where the blocks go in the file when the logger does the write.

Concurrency around Reading Blocks is achieved as follows. FsDirect has lockless reads. A caller attempting to read a block will use the incarnation (i.e. version) number of the block and ensure that the version number remains the same as the version number that the caller saw before the read was completed. Any concurrent writer of the same block will negate the incarnation number of the block version and revert back to a positive incremented version to indicate an in-progress or a committed write. Likewise, the client process is not expected to update a block partially, and therefore serializing execution threads that attempt to update a given data block is not needed. However, that is not true of pointer blocks, as an example in case of directory pointer blocks. If two files are being created, two inodes may be added/ updated concurrently and require a serializing lock. Such updates are rare and the cost of serialization to create inodes is acceptable.

5.3 Example Block Replacement

Figure 7:
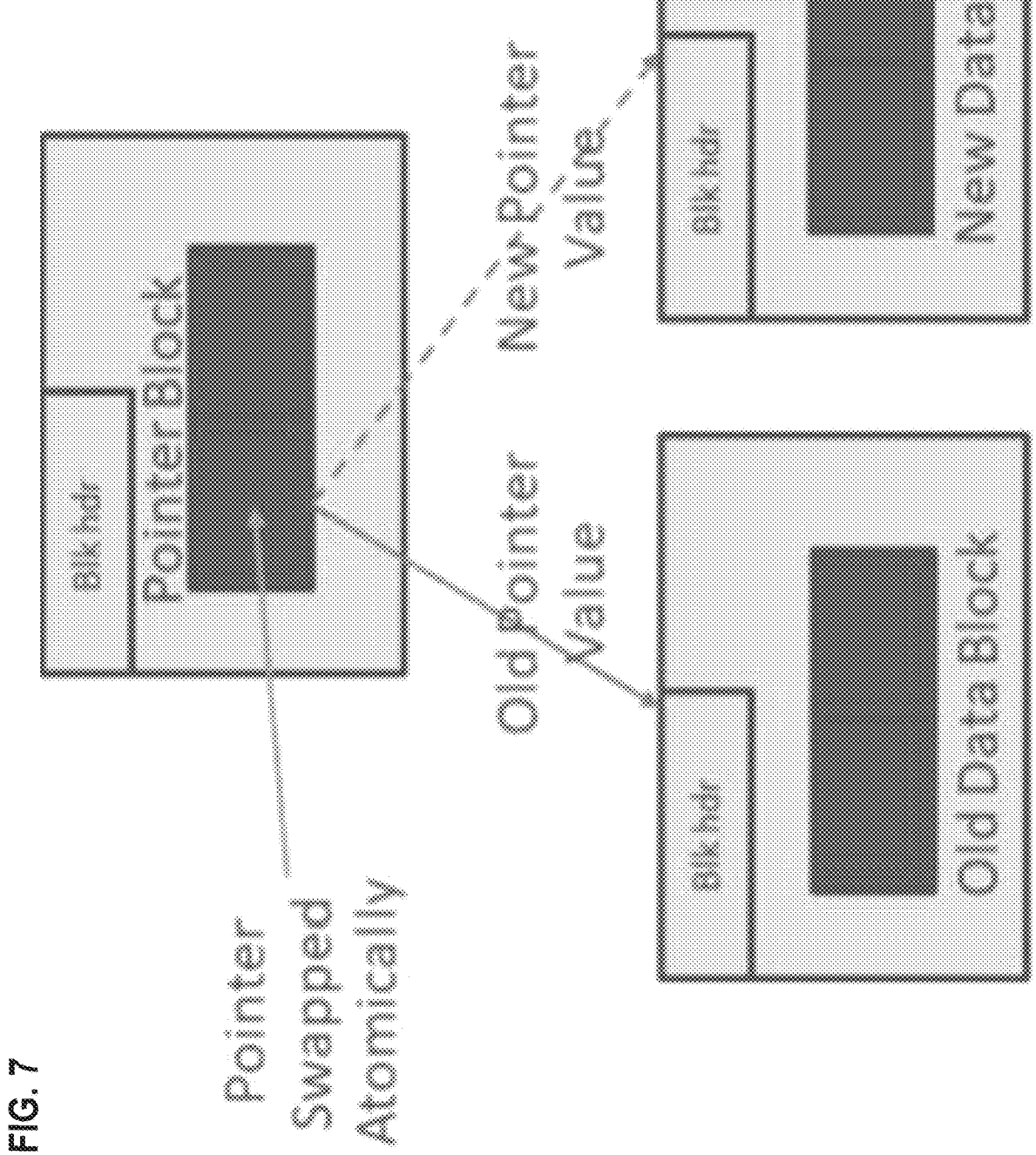
FIG. 7 is a block diagram that depicts an example block update that replaces an old data block with a new data block by reassigning a pointer in a pointer block.

FIG. 7 is a block diagram that depicts an example block update 700, in an embodiment. In operation, an old data block may be replaced with a new data block by reassigning a pointer in a pointer block. All of the pointer block and data blocks of FIG. 7 may reside in PMEM 120 of FIG. 1.

Free PMEM blocks reside in a free block pool (or a list) which are used when data is to be written to any file block. The availability of these blocks is discussed later below. When a writer attempts to write to a file block, the writer reads the same "block version number" of the target block (value N) like a reader would do, and writes a negative value (–N) in the header of a free block that is available, which changes the block version for the selected block in the free pool. The writer then proceeds to update the free block with new data (copies data into the block), atomically updates the inode pointer to the data block, followed by updating the new data block header with next positive integral value (N+1) as its block version number as shown.

This has the effect of updating the file block, so any new reader that arrives after the write is complete, will see the new block. Since the PMEM 8-byte pointer update is atomic, any reader will either see the old block (stale data) or the new block (fresh data), and will never see a torn block in PMEM. The data block need never be deleted. The block is persistent memory and continues to be available with all of its content. Thus there is no memory that is truly freed or deleted. The old data block is simply given back to the free pool for reuse, but its data can be left intact, even if it is clearly stale. It is perfectly acceptable for a reader to use stale data if the reader began before the writer. That is because, for a reader to reach the stale data, such reaching (i.e. indirection dereferencing, a.k.a. pointer chasing) should occur before the writer swaps the pointer in the inode.

Further, FsDirect allows readers to cache, and thereby retain a pointer to (or address of) any PMEM block and continue to access the data, even if it gets stale and the file block is updated by a writer, for as long as desired. A special request marks the data block as Not Reusable. The writer always comes along and swaps the pointer and puts the old block in the free pool. The free pool of blocks serves to supply blocks for writers to consume, but in case the block is marked Not Reusable, the PMEM block remains untouched, along with its data (which is stale if the block is in the free pool).

For example, an Oracle DBMS guarantees that every reader knows what itself is doing and is capable of dealing with staleness of data on its own. The Oracle DBMS also guarantees that there is never more than one writer that would concurrently write/update a given data block in a database file to cause a race condition and/or risk data corruption.

5.4 Example Free List

Figure 8:
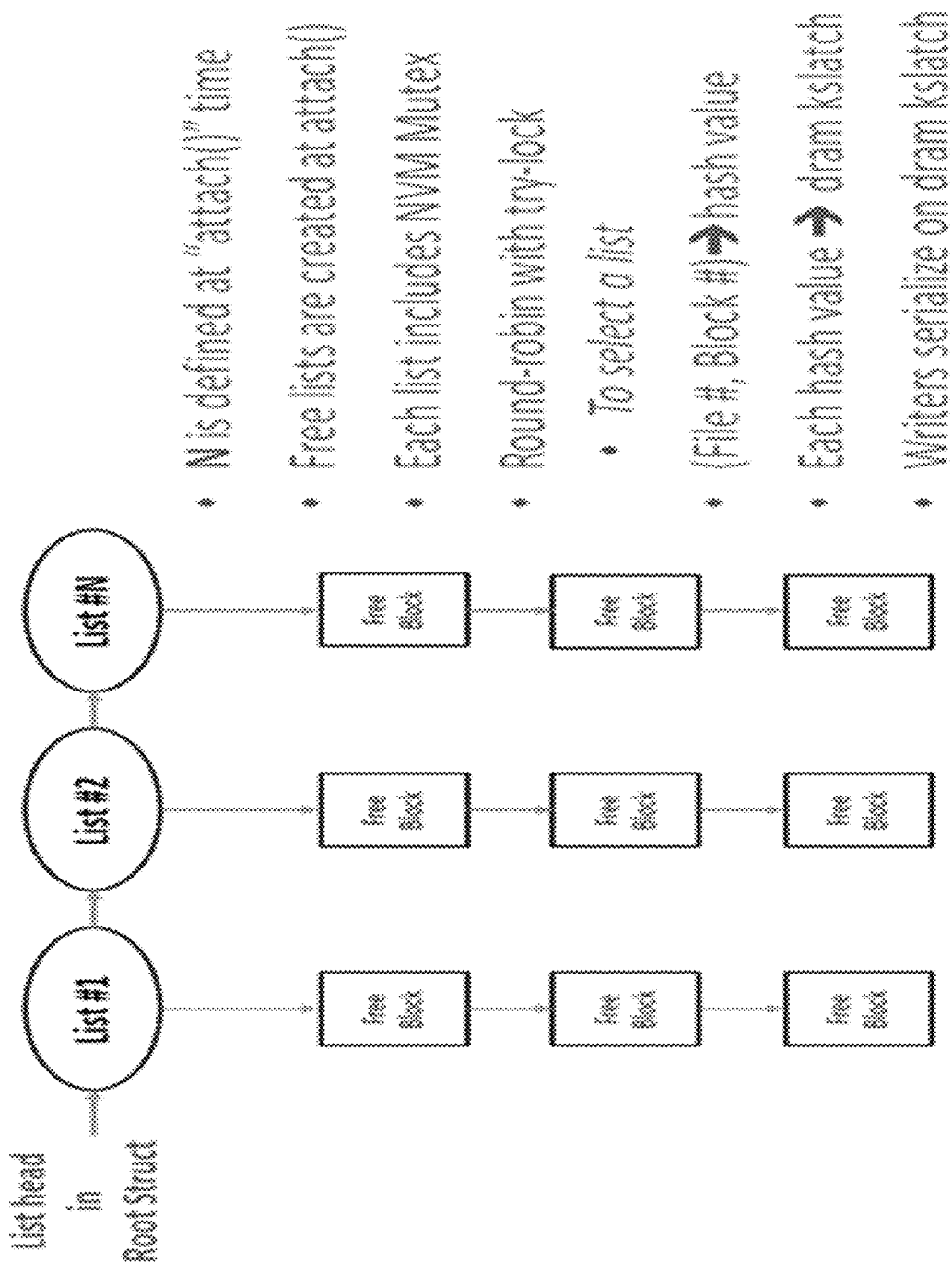
FIG. 8 is a block diagram that depicts example lists for organization of free blocks in PMEM.

FIG. 8 is a block diagram that depicts an example lists 800 for organization of free blocks, in an embodiment. Lists 800, including lists 1-N as shown, organizes free blocks of PMEM 120 of FIG. 1.

All of the free blocks in FsDirect are organized across multiple free lists 1-N to allow for optimal concurrency. Each list is protected by its own lock. The goal is to avoid contention on a single free-list lock for concurrent writes to unrelated files and/or data blocks in the database.

The filesystem creation via the mkfs interface will launch the conversion of available memory into an organization of free blocks and block headers in the physical extent organized as the free-block lists 800 as shown. The process may be time consuming, and hence a background thread/process in the instance will be tasked to complete the task, while the mkfs interface returns immediately. That causes a format marker to indicate the high water mark on what has been formatted from the available physical block extent. As the background thread formats the memory into FsDirect blocks with associated block headers and attaches those to the free lists 800 described above, the marker that identifies the formatted FsDirect size advances. The advancement is done in programmable increments. Thus mkfs has two steps: make the file system, and grow the file system. Any subsequent database operation that requires a formatted block to be available and cannot find one will stall till the background completes formatting a batch of blocks and signals the stalled process that is attempting to create or write to a file.

Here are some scenarios for free list manipulations. There are multiple considerations for various use cases that would reference this organization. Allocation, Replacement and Deletion call for specific nuances. From a file-operations perspective, these three scenarios are defined as follows.

Allocation: Allocation can happen during a write for a sparse file. This may include allocation of pointer blocks in addition to data blocks. Such a scenario is no different from having to extend a file to a size bigger than its current allocation.

Deletion: One form of deletion happens when a file is deleted in totality. In such a case, there may be two options: a) the filesystem creates yet another list of free blocks and attaches the new list to the list of lists or, b) the filesystem works to eventually spread the newly available free blocks across existing free lists. Any other deletion will typically happen during truncation. A similar approach should work in that case as well. As explained above, rarely will it be observed that a single block is being freed up, and in such case, it could be safely added to any of the existing free lists. The root structure and the list head that it contains may reside in metadata 170.

Replacement: As discussed above, a write will require a free block to be available where the write is materialized and the existing block is considered to be free when the incoming write commits. Regardless of the freed block being referenced, it can be added to the free list. The state of such a block is best described as soon to be freed, since the expectation in this case, is that a fresh write will result in invoking a callback to ensure the release of the hold on the old data block.

Rebalance: Lists 800 may become skewed (i.e. unbalanced lengths) over time, and reconciling them will need a background thread to bring them back to balance. The very same background process as above will be advised to rebalance lists 800 when the need arises. The intelligence to start and settle on the final distribution of free blocks among available lists can easily reside within this background and the task can be triggered by periodically doing internal checks.

5.5 Example Configuration

Figure 9:
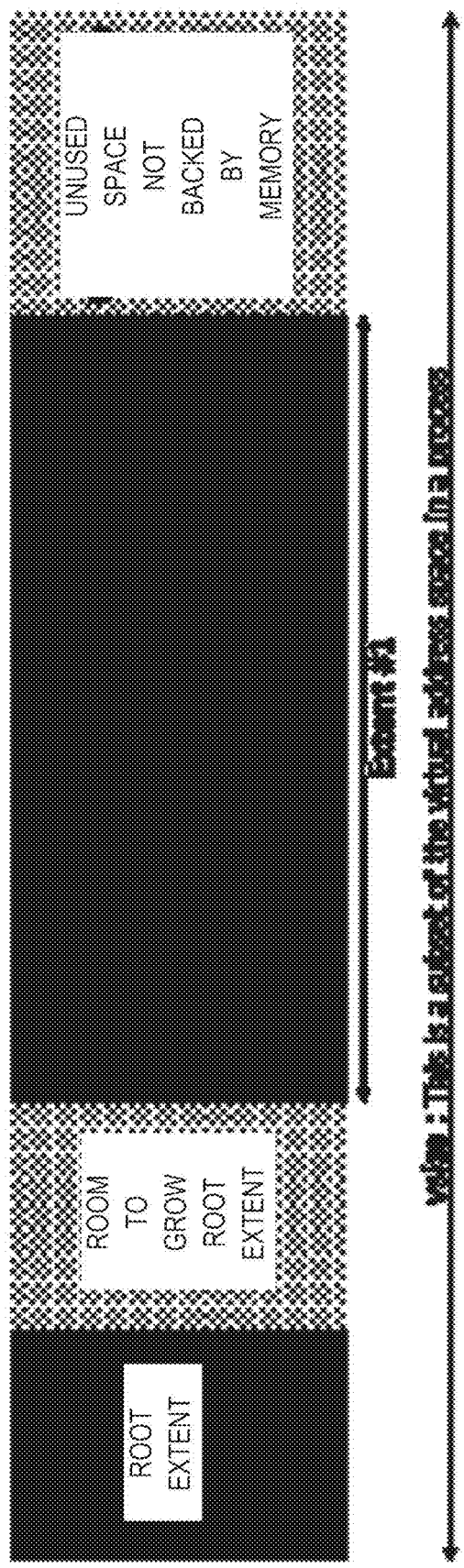
FIG. 9 is a block diagram that depicts an example region file that internally arranges data blocks into specialized extents that accommodate growth.

FIG. 9 is a block diagram that depicts an example region file 900, in an embodiment. Region file 900 may be a native file and internally arranges data blocks into specialized extents that accommodate growth. All of the shown extents of region file 900 contain physical data blocks, except for unused space extent that has no physical data blocks. That is, the unused space extent is virtual. Region file 900, all of its extents except the unused space extent as shown, and all of their data and metadata blocks may reside in PMEM 120 of FIG. 1.

To achieve high performance, FsDirect maps the entire PMEM file store to database processes, so that the database process can directly read data from and write data to PMEM. For corruption isolation in an embodiment, an FsDirect file store should not be shared between databases.

The FsDirect file store can be used to store database datafiles, redo log files, controlfiles, etc. In an embodiment, FsDirect should not be used to store some administrative file types such as trace files and audit files, which may be too large individually or in aggregate. In an embodiment and given that FsDirect related configuration parameters can be specified in init.ora, spfile should not be stored in FsDirect to avoid any bootstrap issues.

PMEM used as storage media offers byte-addressable storage, given certain caveats around atomicity of data updates. Given that data in a database is organized as logical blocks within a file, FsDirect carries forward the familiar concept of file-based data that minimizes the associated disruption in database implementation while still creating ways to address the same storage as addressable memory.

In an embodiment, FsDirect takes a regular file created in an EXT4 mounted file system (or any other DAX-aware file system) and converts it into a container for all files with uniform physical block sizes for a given database. FsDirect implements a notion of physical block size which is used for reference holds. For example, an 8 k physical block implementation would not support a reference hold on blocks smaller than 8 k, nor would it support obtaining a singular reference hold across blocks for sizes greater than 8 k. The following diagram depicts a high level view that explains how an EXT4 file is formatted to serve multiple database files as its contents. As shown below, a Root Extent contains metadata pertaining to PMEM Direct access. The database data and FsDirect metadata is stored in physical blocks in Extent #1 as shown.

The overall internal breakup of physical blocks and the on-media data structures is described later herein. Included are interfaces offered by FsDirect to the database client or the buffer cache. To create a FsDirect file store for a database, an administrator may issue a SQL command to create the FsDirect file store, providing a mount point for the file store as well as a backing file from a native ext4 file system mounted in DAX mode such as follows.

SQL> CREATE PMEMFS cloud_db_1 MOUNTPOINT '/scratch/db/cloud_db_1' BACKINGFILE '/scratch/db_storage/db1' SIZE 2T BLOCK SIZE 8K;

The final directory name in the specified mount point should match the FsDirect file store name. If spfile is used, the DBMS automatically adds the init.ora parameters needed for the DBMS to mount the FsDirect file store during database server startup. For the example above, the following init.ora parameter is automatically added.

PMEM_FILESTORE=('/scratch/db/cloud_db_1', '/scratch/db_storage/db1')

If spfile is not used, the DBA should manually add this init.ora parameter so that Oracle can automatically mount the FsDirect file store during instance startup. The DBA can also manually mount a FsDirect file store using the mount FsDirect file store command described later herein.

Once a FsDirect file store has been created, the FsDirect file store will show up under the given mount point as if it is a native file system. The DBA can proceed to create the database normally under that mount point.

Unlike a native file system, the FsDirect file store will only show up under its mount point after the FsDirect file store has been mounted. Usually, when the database server is up at least in nomount mode, the FsDirect file store will be mounted automatically.

When the DBA creates a FsDirect file store, the DBA should specify a block size. This block size should in general match a default block size for the database datafiles, because that block size is the most efficient block size for files in the FsDirect file store. When the DBA creates redo logs in FsDirect file store, the DBMS will by default use the block size of the FsDirect file store as the redo log file block size.

In a relational DBMS (RDBMS) embodiment, an individual data file in a database inherits a block size from its tablespace, and different tablespaces can have different block sizes. A tablespace can be created with a datafile block size that is different from the underlying FsDirect file store block size. For a tablespace whose block size is a multiple of FsDirect block size, access to such tablespace should be efficient although such tablespace will not get additional performance benefit of direct PMEM read for database queries, as described in elsewhere herein. A tablespace can be created with a block size that is neither the FsDirect file store block size nor multiples of FsDirect file block size. However, access to such a tablespace is inefficient because writing a database block in such a tablespace involves a read-modify-write operation at FsDirect level. For this reason, DBA may consider creating multiple FsDirect filestores such that the filestore block size matches that of the file.

Planning the block size of redo log files may occur as follows. Unlike the database block size, which can be between 2 K (kilobytes) and 32 K, redo log files default to a block size that is equal to the physical sector size of the disk, typically 512 bytes, although 4 K sector size is also supported.

A FsDirect file store usually has a block size matching the database default block size, which is often 8 K. The default block size for redo logs created on such a FsDirect file store would be the FsDirect file store block size. This is the most efficient configuration regarding performance of writing redo logs. However, a bigger redo block size also increases redo waste.

To reduce redo waste, the DBA can create redo logs with a smaller block size on FsDirect. If the DBA creates a primary database with a standby database on conventional disk storage, the DBA may use 512 K as the block size of the redo logs so that the standby can accept the archived redo logs from the primary. The DBA can specify a specific block size when creating redo logs as follows.

SQL> ALTER DATABASE orcl ADD LOGFILE GROUP 4 ('/u01/logs/orcl/redo04a.log', '/u01/logs/orcl/redo04b.log') SIZE 100M BLOCKSIZE 512 REUSE;

When the block size of redo logs is smaller than the block size of the FsDirect file store, writing of redo logs is not the most efficient. For any redo write that only covers part of a FsDirect block, FsDirect may have to perform read-modify-write.

It is recommended to use spfile for a database to be placed entirely inside a FsDirect file store. However, spfile itself should not be stored inside FsDirect file store to avoid bootstrap issues. Spfile lets the DBMS update init.ora parameters automatically when creating and dropping FsDirect file stores.

Pluggable database (PDB) cloning occurs as follows. Most of cloning steps are similar to those without FsDirect, except PDB snapshot copy. PDB cloning with snapshot copy depends on the fact that FsDirect supports sparse files. To be consistent with current behavior of PDB thin cloning (snapshot copy) on a linux file system (e.g. EXT4), the users should set CLONEDB parameter to TRUE if they decide to let FsDirect sparse file capability handle the cloning process. If so, then the original files will not be touched and only the modified blocks will be written in the new files (copy-on-write).

If CLONEDB is set to FALSE, the underlying file system for the source PDB's files should support storage snapshots. Such file systems include Oracle Automatic Storage Management Cluster File System (Oracle ACFS) and Direct network filesystem (NFS) Client storage. If the DBA decides to use a storage snapshot, then the DBA is expected to configure the storage properly as would be done for cloning without FsDirect.

5.6 Example Security

Figure 10:
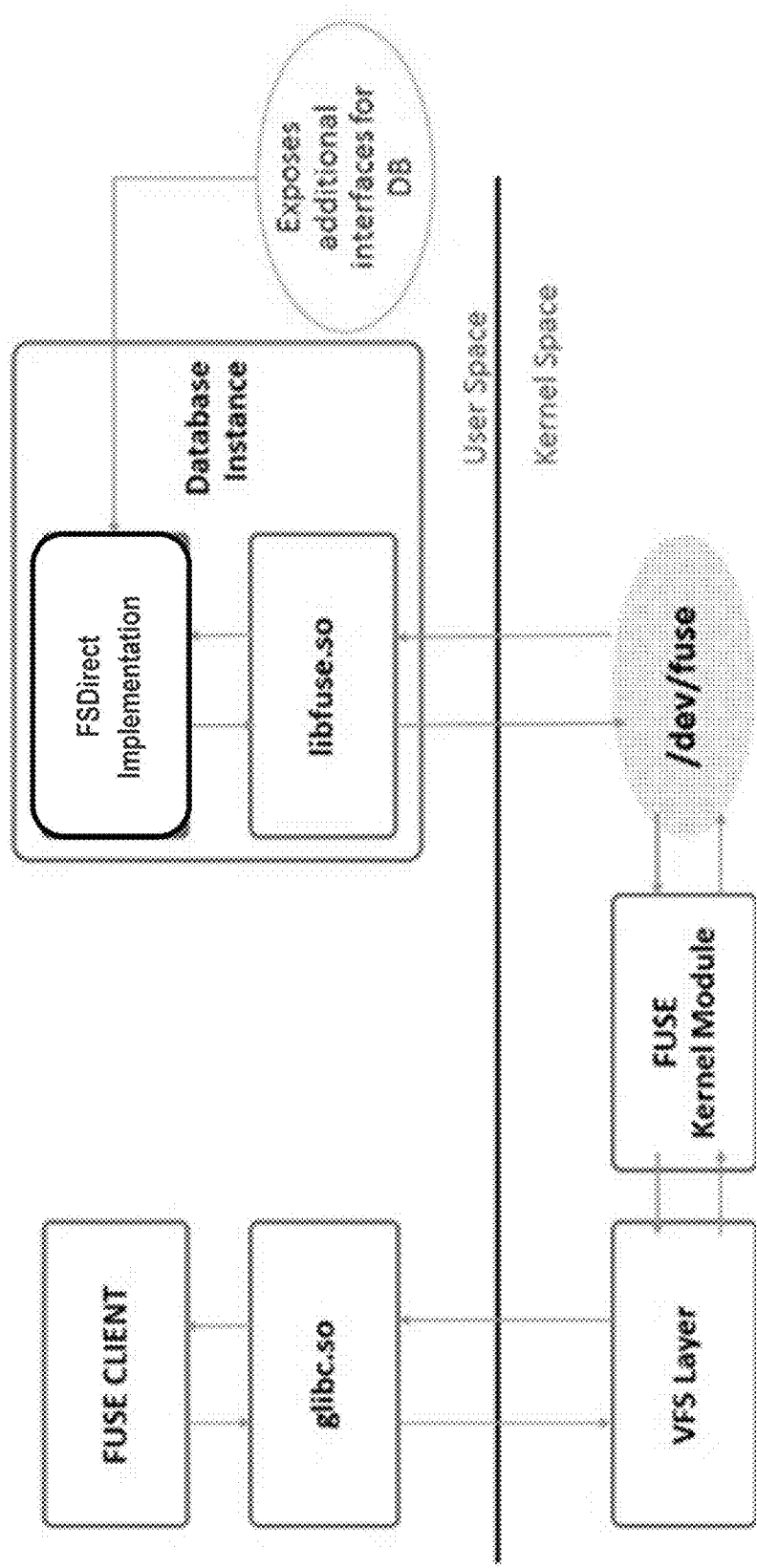
FIG. 10 is a block diagram that depicts an example architecture of infrastructure software that contains modules and layers that are segregated into user space and kernel space for security.

FIG. 10 is a block diagram that depicts an example architecture of infrastructure software 1000, in an embodiment. As shown, infrastructure software 1000 contains modules and layers that are segregated into user space and kernel space for security. The less of the shown software resides in kernel space of an operating system (OS), the more secure is infrastructure software 1000.

The shown component/dev/fuse may be a backing file that resides in an FsDirect file store such as in PMEM 120 of FIG. 1. User space and kernel space, including the shown virtual file system (VFS) layer, may be loaded into volatile memory of computer 100.

FsDirect is a purpose built container to store database files. As such, FsDirect is a component that is external to a database itself. Even though a database administrator can query file store attributes using V$PMEM_FILESTORE view, a PMEM file store is not represented and managed as a database object in a data dictionary of the database.

A PMEM file store backing file (also known as a container file, not to be confused with a container database) is visible as a file in the Operating System (OS) filesystem hierarchy. OS level security attributes, such as file ownership, permissions, extended attributes, etc. are applicable only to the backing file itself, but not to the contents stored in that file store. Instead, OS level security attributes of this backing file are automatically inherited by all of the individual database files created in that PMEM file store, and OS level security attributes associated with the directory containing the backing file are inherited by all of the directories in that PMEM file store. That implies that if an OS user has permissions to read or write the PMEM backing file, then that user also has permissions to read or write individual database files contained within that PMEM file store. Likewise if an OS user has permissions to list, search or create files in the directory containing backing file, then that user will also have same permissions to perform the same operations in any directory inside that PMEM file store.

On platforms such as Linux and Solaris, contents within the backing file are exposed to OS users as a file hierarchy via a filesystem in userspace (FUSE) mount point. FUSE access is intended to facilitate common operational/administrative tasks such as migrating files in and out of the PMEM file store.

FsDirect does not purport to be a complete POSIX-compliant file system by itself. However, to support external tools, FsDirect will support and interact with a FUSE daemon for external tools to access files created by the database. The description of the FUSE implementation is outside of the scope of this document, except for the assumption that it will run as a part of the same instance as FsDirect.

The picture above depicts the FUSE implementation around FsDirect and its database instance. FsDirect does not purport to be a complete POSIX-compliant file system by itself. However, to support external tools, FsDirect will support and interact with a FUSE daemon for external tools to access files created by the database.

In an Oracle embodiment, FsDirect supports all of the Security features of an Oracle Database. In particular, FsDirect supports tablespace encryption. However, one advantage of using FsDirect is to enable the directly mapped buffer cache for an Oracle PMEM database. When encryption is enabled for a tablespace, database blocks in that tablespace will not get the performance advantage of being able to directly read from PMEM for queries.

Three new SQL commands, CREATE/ALTER/DROP PMEM FILESTORE, are added to the set of available SQL commands in this project. These commands can be executed when database is in NOMOUNT mode (or even prior to creation of the database). For this reason, authentication and authorization for the session issuing these commands follow a same protocol and criteria as that of a session that is allowed to perform similar operations such as create, mount, and/or flashback the database. When these commands are executed while the database is open, these commands (a) are only permitted when session is connected to cdb$root in the Multi-tenant mode, and (b) require SYSDBA database privilege.

6.0 Example Implementation

FsDirect provides direct map application program interfaces (APIs) for PMEM blocks as follows.

Clients capable of direct pinning FsDirect blocks are encouraged to register a callback which allows FsDirect code to notify the client code that a direct pin is preventing FsDirect code from relocating the block. This can happen during a filestore shrink operation.

FsDirect passes along file number, block number, file type and virtual address of the block to the callback. Callback code is expected to release a direct block pin as soon as possible; however, it is not required to release the pin immediately. Note that other than virt_addr, other parameters may not be applicable depending on the operation that resulted in acquiring a reference on the FsDirect block. For example, since a Borrow operation places a reference on a free file store block, fno, bno and file-type parameters are not applicable.

A Callback may be invoked in the context of a process/ thread other than the one that acquired a pin on the block.

It is an error to Forfeit a free block and Return a valid block. In addition, FsDirect clients can register a callback which would be called by FsDirect in the event filestore needs to take back ownership of that block.

For Fsd_BlockRetrieveRef_op, the client must specify identity of the target block using fob, fno and bno parameters. Also, virt_addr must be set to NULL. If operation is successful, virt_addr is set to virtual address of the target FsDirect block.

For FsD_BlockBorrow_op, the client must set virt_addr to NULL. All other parameters are ignored. Successful completion of the operation will result in virt_addr to be set to virtual address of the borrowed FsDirect block.

For FsD_BlockForfeitRef_op and Fsd_BlockReturn_op, the virt_addr must not be NULL. It must be a virtual address of a block returned by prior successful Fsd_BlockRetrieveRef_op or Fsd_BlockBorrow_op operations. Successful operation will set virt_addr to NULL.

For FsD_BlockAdopt_op, the client must specify a new identity for the adopted block using fob, fno and bno parameters. Successful completion of the operation will result in an adopted block replacing a previous version of the file block (as if contents of file block 'bno' were updated with a write( ) operation).

For clients such as RMAN, there may be a use case that needs to examine a few bytes of block contents to decide if the full block contents need to be read into a user buffer. In this scenario, block hold and release operations may be less efficient and/or an RDBMS instance may not even be online. To accommodate this use case, FsDirect has an API where clients supply an examination callback. This callback determines whether that block should be copied, or that the copy operation should be completely skipped.

Clients supply a callback function 'cbk' and context 'cbkctx', along with an identity of the file block to be read. The Callback function is passed a virtual address and size of the block so that contents of the FsDirect block can be examined. If full contents of the block should be copied into the client supplied read buffer, then the callback returns TRUE. Otherwise it returns FALSE to skip copying anything. The callback implementation should be idempotent, as the callback may be called multiple times for the same FsDirect block.

If the callback returns TRUE, contents of the block are copied to 'buffer' and a number of bytes copied is returned. If the callback returns FALSE, block contents are not copied to 'buffer', and 0 is returned. In case of an error, −1 is returned and 'oerr' is set to an error code.

Members of odm_pmem_ioc struct specify parameters specific to the target FsDirect block. The API allows a count of operations to be issued in a single call. Parameter num_complete is set to 0 on entry. It is incremented as each individual operation is performed. A Return code from the API indicates error associated with the last unsuccessful operation.

The odm_cond_read( ) API is designed to conditionally copy contents of a specified FsDirect file block into a client read buffer. This API invokes a client supplied callback, which is intended to quickly examine contents of an FsDirect block and return TRUE if full contents of that block should be copied into client supplied read buffer. If the callback function returns FALSE, contents of FsDirect block are not copied. Return value of 0 indicates block copy was skipped by the callback, return value >0 indicates number of bytes copied into user read buffer, and return value of <0 indicates that the operation failed.

Clients supply a callback function eval_cbk and context cbkctx, along with an identity of the file block to be read. The Callback function is passed a virtual address and size of the block so that contents of the FsDirect block can be examined. The Callback function should return TRUE if full contents of the block should be copied into the client supplied read buffer. Otherwise callback should return FALSE to skip copying anything. Note that callback implementation should be idempotent, as the callback may be called multiple times for the same FsDirect block.

7.0 Example Method

Based on techniques presented earlier herein, the following is a novel example method that guarantees that, without waiting, a database block can be copied from PMEM to volatile memory without being torn, which the state of the art could not do.

A method comprising without waiting:
  storing, in byte addressable persistent memory (PMEM), a database block;
  copying into dynamic random access memory (DRAM) or reading an image of the database block;
  detecting whether or not the image of the database block is torn.

8.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

8.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
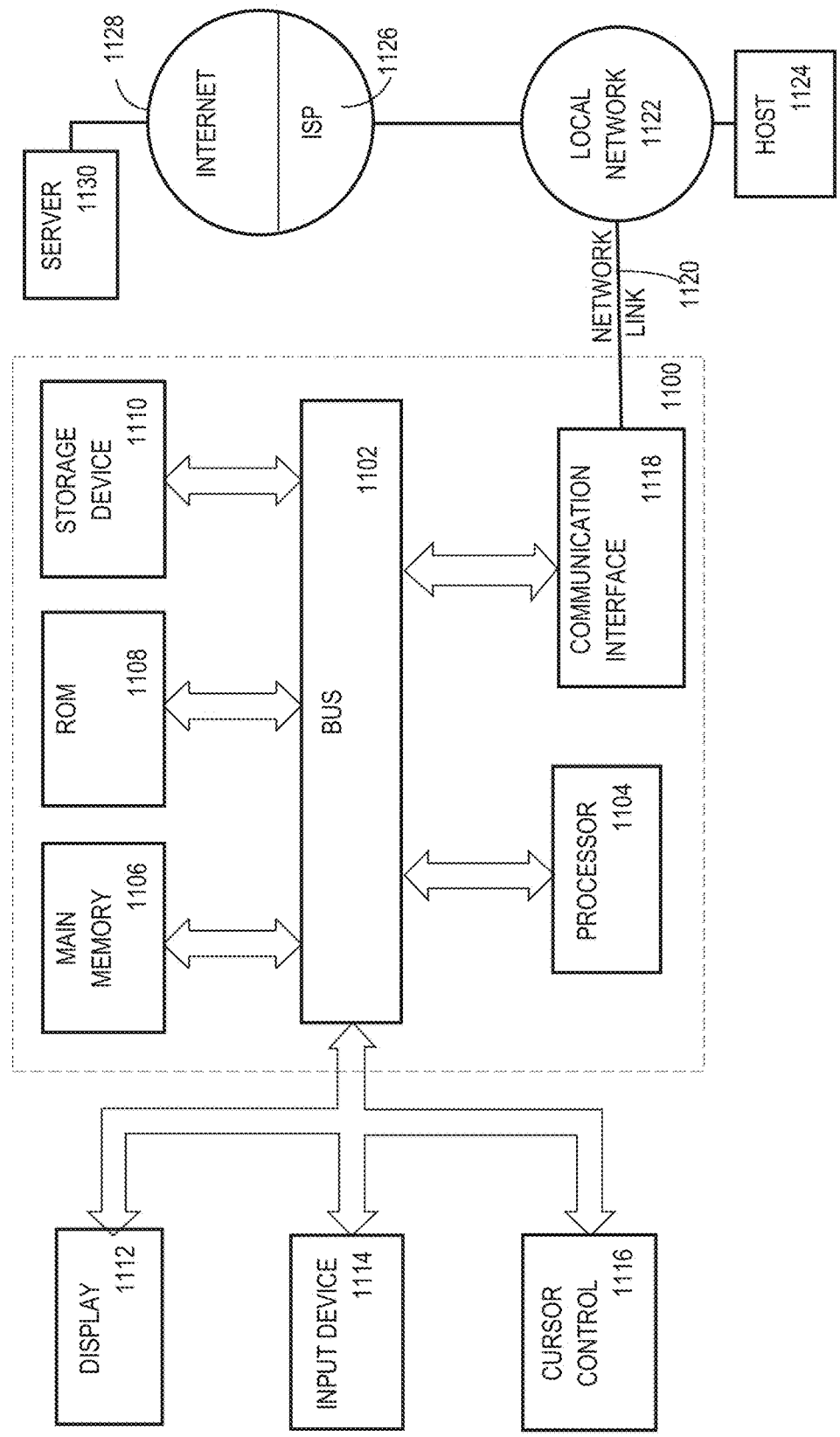
FIG. 11 is a block diagram that illustrates a computer system upon which an embodiment of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

Software Overview

Figure 12:
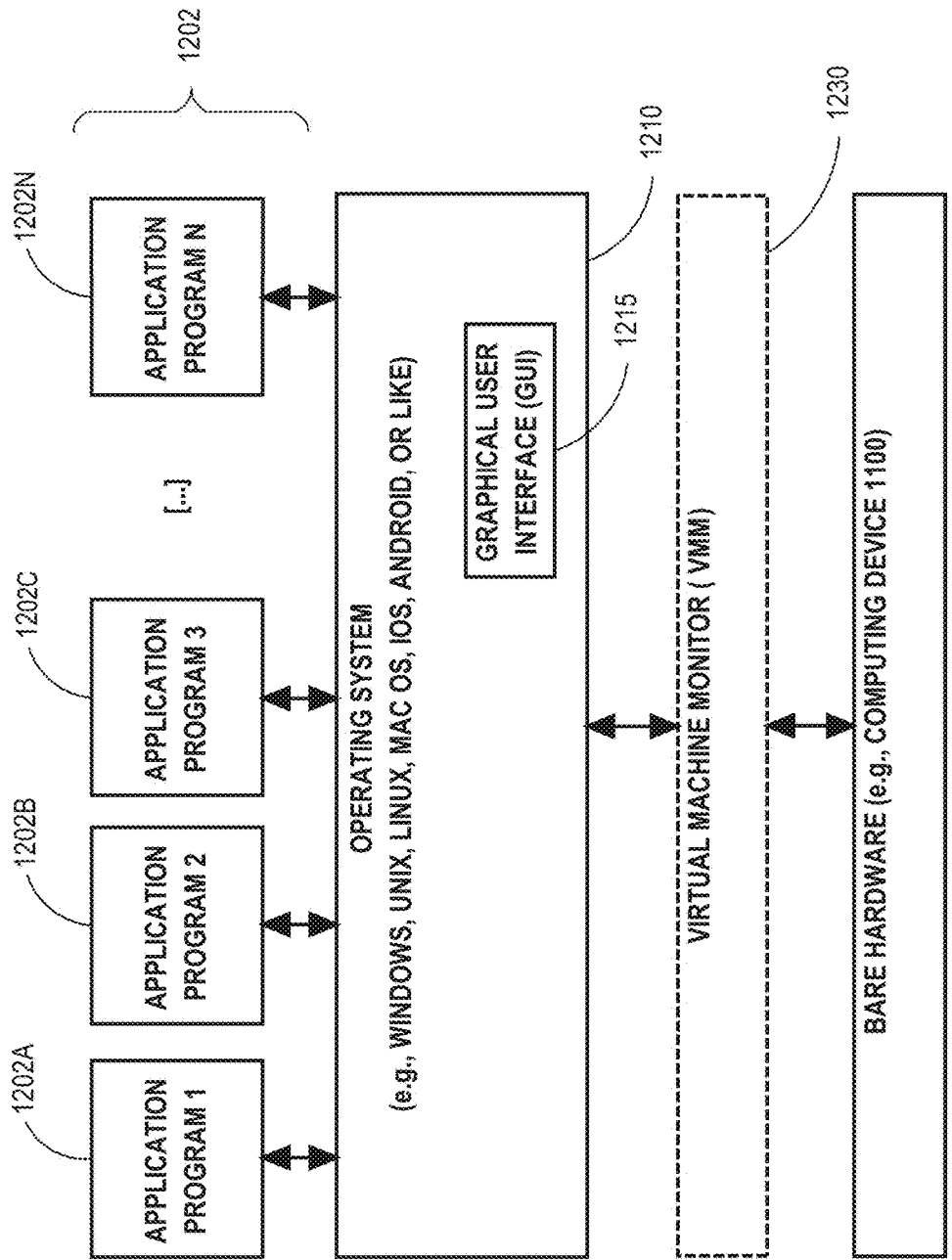
FIG. 12 is a block diagram that illustrates a basic software system that may be employed for controlling the operation of a computing system.

FIG. 12 is a block diagram of a basic software system 1200 that may be employed for controlling the operation of computing system 1120. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of computing system 1100. Software system 1200, which may be stored in system memory (RAM) 1106 and on fixed storage (e.g., hard disk or flash memory) 1110, includes a kernel or operating system (OS) 1210.

The OS 1210 manages low-level aspects of computer operation, including managing execution of processes, memory allocation, file input and output (I/O), and device I/O. One or more application programs, represented as 1202A, 1202B, 1202C . . . 1202N, may be "loaded" (e.g., transferred from fixed storage 1110 into memory 1106) for execution by the system 1200. The applications or other software intended for use on computer system 1100 may also be stored as a set of downloadable computer-executable instructions, for example, for downloading and installation from an Internet location (e.g., a Web server, an app store, or other online service).

Software system 1200 includes a graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or application(s) 1202. The GUI 1215 also serves to display the results of operation from the OS 1210 and application(s) 1202, whereupon the user may supply additional inputs or terminate the session (e.g., log off).

OS 1210 can execute directly on the bare hardware 1220 (e.g., processor(s) 1104) of computer system 1100. Alternatively, a hypervisor or virtual machine monitor (VMM) 1230 may be interposed between the bare hardware 1220 and the OS 1210. In this configuration, VMM 1230 acts as a software "cushion" or virtualization layer between the OS 1210 and the bare hardware 1220 of the computer system 1100.

VMM 1230 instantiates and runs one or more virtual machine instances ("guest machines"). Each guest machine comprises a "guest" operating system, such as OS 1210, and one or more applications, such as application(s) 1202, designed to execute on the guest operating system. The VMM 1230 presents the guest operating systems with a virtual operating platform and manages the execution of the guest operating systems.

In some instances, the VMM 1230 may allow a guest operating system to run as if it is running on the bare hardware 1220 of computer system 1200 directly. In these instances, the same version of the guest operating system configured to execute on the bare hardware 1220 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMM 1230 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
  without locking,
    a reader process of a database management system (DBMS) obtaining, from metadata in persistent memory (PMEM), a first memory address for directly accessing a current version, which is a particular version, of a database block in the PMEM, wherein the PMEM does not comprise at least one selected from the group consisting of a disk and a block-oriented device;
  concurrently:
    the reader process reading the particular version of the database block in the PMEM, and
    a writer process of the DBMS replacing, in the metadata in the PMEM, the first memory address with a second memory address for directly accessing a new version of the database block in the PMEM,
    wherein said reading the particular version of the database block in the PMEM comprises using at least one selected from the group consisting of: byte addressable direct access (DAX) to hardware and a filesystem in userspace (FUSE).
2. The method of claim 1 wherein said replacing, in the metadata in the PMEM, the first memory address with the second memory address is atomic.
3. The method of claim 1 wherein said reading the particular version of the database block in the PMEM does not use: a block device driver nor a block-oriented input/output (I/O) system call of an operating system (OS).
4. The method of claim 1 wherein said reading the particular version of the database block in the PMEM comprises:
  copying the particular version of the database block from the PMEM to volatile memory, and
  said reader process or a different reader process reading the particular version of the database block in the volatile memory.
5. The method of claim 4 wherein said copying the particular version of the database block to the volatile memory comprises copying the particular version of the database block into a block cache.
6. The method of claim 5 further comprising allocating said new version of the database block in the block cache after said replacing, in the metadata in PMEM, the first memory address with the second memory address.
7. The method of claim 5 wherein after said replacing, in the metadata in PMEM, the first memory address with the second memory address: the block cache contains the particular version of the database block but not said new version of the database block.
8. The method of claim 4 further comprising detecting that a previous version of the database block in the volatile memory is stale based on said obtaining, from said metadata in the PMEM, the first memory address for directly accessing the particular version of the database block in PMEM.
9. A method comprising:
  without locking:
    a reader process of a database management system (DBMS) obtaining, from metadata in persistent memory (PMEM), a first memory address for directly accessing a current version, which is a particular version, of a database block in the PMEM;
  concurrently without locking:
    the reader process reading the particular version of the database block in the PMEM, and
    a writer process of the DBMS replacing, in the metadata in the PMEM, the first memory address with a second memory address for directly accessing a new version of the database block in the PMEM;
  detecting that a copy of the particular version of the database block is torn.
10. One or more non-transitory computer-readable media storing instruction that, when executed by one or more processors, cause:
  without locking,
    a reader process of a database management system (DBMS) obtaining, from metadata in persistent memory (PMEM), a first memory address for directly accessing a current version, which is a particular version, of a database block in the PMEM, wherein the PMEM does not comprise at least one selected from the group consisting of a disk and a block-oriented device;
  concurrently:
    the reader process reading the particular version of the database block in the PMEM, and a writer process of the DBMS replacing, in the metadata in the PMEM, the first memory address with a second memory address for directly accessing a new version of the database block in the PMEM,
wherein said reading the particular version of the database block in the PMEM comprises using at least one selected from the group consisting of: byte addressable direct access (DAX) to hardware and a filesystem in userspace (FUSE).

11. The one or more non-transitory computer-readable media of claim 10 wherein said replacing, in the metadata in the PMEM, the first memory address with the second memory address is atomic.

12. The one or more non-transitory computer-readable media of claim 10 wherein said reading the particular version of the database block in the PMEM does not use: a block device driver nor a block-oriented input/output (I/O) system call of an operating system (OS).

13. The one or more non-transitory computer-readable media of claim 10 wherein said reading the particular version of the database block in the PMEM comprises:
copying the particular version of the database block from the PMEM to volatile memory, and
said reader process or a different reader process reading the particular version of the database block in the volatile memory.

14. The one or more non-transitory computer-readable media of claim 13 wherein said copying the particular version of the database block to the volatile memory comprises copying the particular version of the database block into a block cache.

15. The one or more non-transitory computer-readable media of claim 14 wherein the instructions further cause allocating said new version of the database block in the block cache after said replacing, in the metadata in PMEM, the first memory address with the second memory address.

16. The one or more non-transitory computer-readable media of claim 14 wherein after said replacing, in the metadata in PMEM, the first memory address with the second memory address: the block cache contains the particular version of the database block but not said new version of the database block.

17. The one or more non-transitory computer-readable media of claim 13 wherein the instructions further cause detecting that a previous version of the database block in the volatile memory is stale based on said obtaining, from said metadata in the PMEM, the first memory address for directly accessing the particular version of the database block in PMEM.

18. One or more non-transitory computer-readable media storing instruction that, when executed by one or more processors, cause:
without locking:
a reader process of a database management system (DBMS) obtaining, from metadata in persistent memory (PMEM), a first memory address for directly accessing a current version, which is a particular version, of a database block in the PMEM;
concurrently without locking:
the reader process reading the particular version of the database block in the PMEM, and
a writer process of the DBMS replacing, in the metadata in the PMEM, the first memory address with a second memory address for directly accessing a new version of the database block in the PMEM;
detecting that a copy of the particular version of the database block is torn.

19. A method comprising:
without locking:
a reader process of a database management system (DBMS) obtaining, from metadata in persistent memory (PMEM), a first memory address for directly accessing a current version, which is a particular version, of a database block in the PMEM, wherein the PMEM does not comprise at least one selected from the group consisting of a disk and a block-oriented device;
concurrently without locking:
the reader process reading the particular version of the database block in the PMEM, and
a writer process of the DBMS writing content into a new version of the database block in the PMEM,
wherein said reading the particular version of the database block in the PMEM comprises using at least one selected from the group consisting of: byte addressable direct access (DAX) to hardware and a filesystem in userspace (FUSE).

20. The method of claim 1 wherein a chip contains the PMEM.

21. One or more non-transitory computer-readable media storing instruction that, when executed by one or more processors, cause:
without locking:
a reader process of a database management system (DBMS) obtaining, from metadata in persistent memory (PMEM), a first memory address for directly accessing a current version, which is a particular version, of a database block in the PMEM, wherein the PMEM does not comprise at least one selected from the group consisting of a disk and a block-oriented device;
concurrently without locking:
the reader process reading the particular version of the database block in the PMEM, and
a writer process of the DBMS writing content into a new version of the database block in the PMEM,
wherein said reading the particular version of the database block in the PMEM comprises using at least one selected from the group consisting of: byte addressable direct access (DAX) to hardware and a filesystem in userspace (FUSE).

22. The method of claim 8 wherein comprising detecting that the previous version of the database block in the volatile memory is stale comprises, after said copying the particular version of the database block from the PMEM to the volatile memory, the reader process detecting, in the metadata in the PMEM, the second memory address for directly accessing the new version of the database block in the PMEM.

23. The method of claim 9 wherein the detecting that the copy of the particular version of the database block is torn does not comprise calculating a checksum.

24. The method of claim 9 wherein:
the method further comprises, without locking, the reader process reading, from the metadata in the PMEM, a first reading of a status indicator for the database block;
the detecting that the copy of the particular version of the database block is torn comprises, after said reading the particular version of the database block in the PMEM:
rereading, from the metadata in the PMEM, a second reading of the status indicator for the database block, and
detecting that the second reading of the status indicator for the database block does not match the first reading of the status indicator for the database block.

25. The method of claim 24 wherein the detecting that the second reading of the status indicator does not match the first reading of the status indicator comprises detecting that the second reading of the status indicator contains at least one selected from the group consisting of a particular Boolean value, an incremented count, and a particular arithmetic sign of a number.

26. The one or more non-transitory computer-readable media of claim 18 wherein the detecting that the copy of the particular version of the database block is torn does not comprise calculating a checksum.

\* \* \* \* \*